United States Patent
Arai et al.

(10) Patent No.: US 12,188,159 B2
(45) Date of Patent: Jan. 7, 2025

(54) METHOD FOR PRODUCING CARBON NANOFIBER COMPOSITE AND CARBON NANOFIBER COMPOSITE

(71) Applicant: DENKA COMPANY LIMITED, Tokyo (JP)

(72) Inventors: Toru Arai, Tokyo (JP); Hitoshi Kaneko, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 14 days.

(21) Appl. No.: 17/455,547

(22) Filed: Nov. 18, 2021

(65) Prior Publication Data

US 2022/0074081 A1 Mar. 10, 2022

Related U.S. Application Data

(62) Division of application No. 15/753,138, filed as application No. PCT/JP2016/071088 on Jul. 15, 2016, now Pat. No. 11,208,741.

(30) Foreign Application Priority Data

Aug. 17, 2015 (JP) .................. 2015-160699

(51) Int. Cl.
*H01B 1/00* (2006.01)
*B01J 21/06* (2006.01)
(Continued)

(52) U.S. Cl.
CPC .......... *D01F 9/1278* (2013.01); *B01J 21/063* (2013.01); *B01J 21/18* (2013.01); *B01J 23/02* (2013.01);
(Continued)

(58) Field of Classification Search
CPC . H01B 1/00; H01B 1/02; C08K 3/041; C09D 5/24; D01F 9/12; C23C 16/26
See application file for complete search history.

(56) References Cited

U.S. PATENT DOCUMENTS 7,914,708 B2 3/2011 Tobori et al.
8,709,539 B2 4/2014 Ando et al.
(Continued)

FOREIGN PATENT DOCUMENTS

CN 103180497 A 6/2013
EP 2778266 A1 9/2014
(Continued)

OTHER PUBLICATIONS

Tibbetts et al "A review of the fabrication and properties of vapor-grown carbon nanofiber/polymer composites", Composites Science and Technology 67 (2007) 1709-1718.*

(Continued)

*Primary Examiner* — Mark Kopec
(74) *Attorney, Agent, or Firm* — Mark T. Vogelbacker; Eckert Seamans Cherin & Mellott, LLC

(57) ABSTRACT

A method for a carbon nanofiber composite, which can obtain a carbon nanofiber composite with high productivity and high activity, and which does not require removal of fluidizing materials or dispersing materials, provides a carbon nanofiber composite having improved dispersibility. The method for producing the carbon nanofiber composite includes bringing at least one catalyst and at least one particulate carbon material into contact with at least one gas containing at least one gaseous carbon-containing compound while mechanically stirring the catalyst and the particulate carbon material in a reactor. The carbon nanofiber composite includes carbon nanofibers and at least one particulate carbon material, wherein the particulate carbon material has 70% by volume or more of particles with a (Continued)

particle diameter of 1 μm or less, and/or a median diameter D50 by volume of 1 μm or less.

9 Claims, 5 Drawing Sheets

(51) Int. Cl.
| | |
|---|---|
| *B01J 21/18* | (2006.01) |
| *B01J 23/02* | (2006.01) |
| *B01J 23/75* | (2006.01) |
| *B01J 23/755* | (2006.01) |
| *C08K 3/04* | (2006.01) |
| *C08L 101/00* | (2006.01) |
| *C09D 5/24* | (2006.01) |
| *C09D 7/40* | (2018.01) |
| *C09D 11/037* | (2014.01) |
| *C09D 11/52* | (2014.01) |
| *C09D 201/00* | (2006.01) |
| *D01F 9/12* | (2006.01) |
| *D01F 9/127* | (2006.01) |
| *D01F 9/32* | (2006.01) |
| *H01B 1/22* | (2006.01) |
| *H01B 1/24* | (2006.01) |
| *H01M 4/13* | (2010.01) |
| *H01M 4/62* | (2006.01) |

(52) U.S. Cl.
CPC ............. *B01J 23/75* (2013.01); *B01J 23/755* (2013.01); *C08K 3/041* (2017.05); *C08K 3/046* (2017.05); *C08L 101/00* (2013.01); *C09D 5/24* (2013.01); *C09D 7/69* (2018.01); *C09D 7/70* (2018.01); *C09D 11/037* (2013.01); *C09D 11/52* (2013.01); *C09D 201/00* (2013.01); *D01F 9/32* (2013.01); *H01B 1/22* (2013.01); *H01B 1/24* (2013.01); *H01M 4/13* (2013.01); *H01M 4/625* (2013.01); *C08K 3/04* (2013.01); *C08K 2201/001* (2013.01); *C08K 2201/003* (2013.01); *C08K 2201/005* (2013.01); *C08K 2201/014* (2013.01)

(56) References Cited

U.S. PATENT DOCUMENTS

| | | | |
|---|---|---|---|
| 9,228,100 | B2 | 1/2016 | Kumashiro et al. |
| 9,397,340 | B2 | 7/2016 | Yamamoto et al. |
| 9,660,271 | B2 | 5/2017 | Takahashi et al. |
| 9,748,017 | B2 | 8/2017 | Takahashi et al. |
| 2009/0220767 | A1 | 9/2009 | Schlogl et al. |
| 2010/0261058 | A1* | 10/2010 | Lopatin ................. H01M 4/133 |
| | | | 118/500 |
| 2011/0158892 | A1 | 6/2011 | Yamaki |
| 2012/0009344 | A1* | 1/2012 | Ando ..................... B01J 23/462 |
| | | | 118/724 |
| 2014/0272596 | A1 | 9/2014 | Yamamoto et al. |
| 2022/0064004 | A1* | 3/2022 | Chiattello ................ B01J 4/007 |

FOREIGN PATENT DOCUMENTS

| | | |
|---|---|---|
| JP | 3369996 A | 9/1999 |
| JP | 2006-045051 A | 2/2006 |
| JP | 2008-56523 A | 3/2008 |
| JP | 2008-535763 A | 9/2008 |
| JP | 2011-213518 A | 10/2011 |
| JP | 2014-177722 A | 9/2014 |
| WO | 2010/095509 A1 | 8/2010 |

OTHER PUBLICATIONS

Pinilla et al "Ni- and Fe-based catalysts for hydrogen and carbon nanofilament production by catalytic decomposition of methane in a rotary bed reactor", Fuel Processing Technology 92 (2011) 1480-1488.*

Philippe et al "Catalytic Production of Carbon Nanotubes by Fluidized-Bed CVD", Chem. Vap. Deposition 2007, 13, 447-457.*

Dasgupta, K., et al., Formation of bamboo-shaped carbon nanotubes on carbon black in a fluidized bed, J. Nanoparticle Res, Mar. 2012, pp. 1-9 vol. 14, No. 3.

ThermoFisher Scientific, Safety Data Sheet, Creation Date Nov. 14, 2018, Revision Date Apr. 2, 2024, Revision No. 3, pp. 1-8.

* cited by examiner

[FIG. 1]
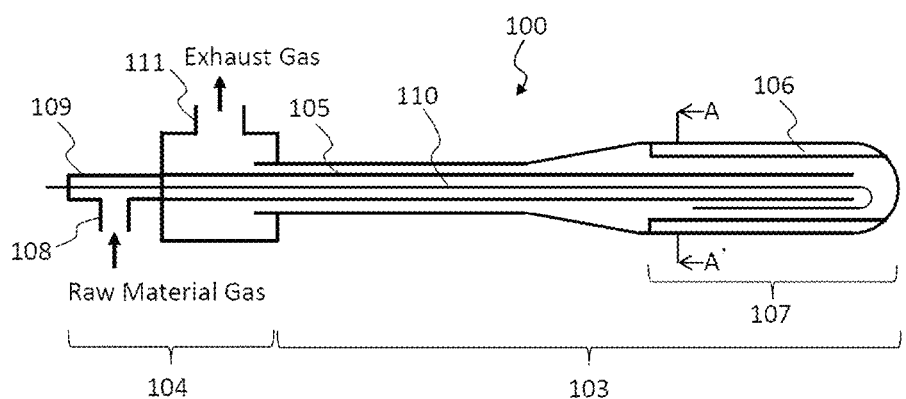
[FIG. 2]
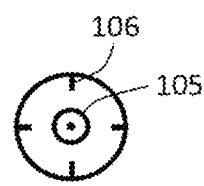
End View along Line A-A'

[FIG. 3]
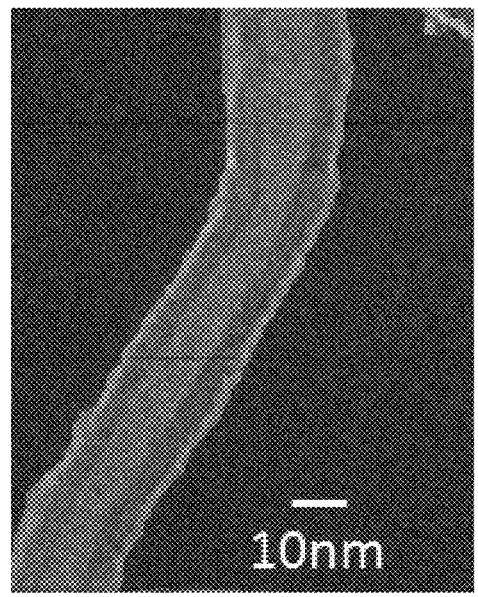
[FIG. 4]
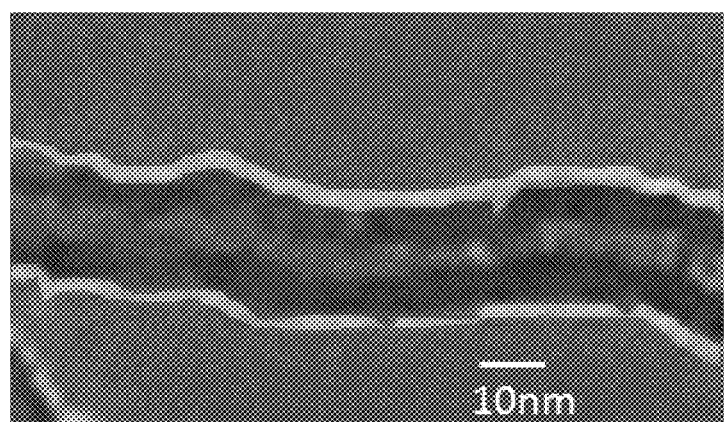

[FIG. 5]
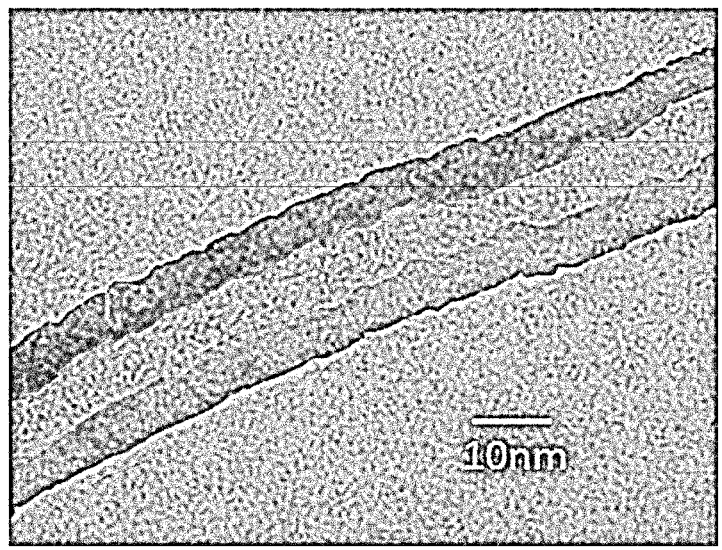
[FIG. 6]
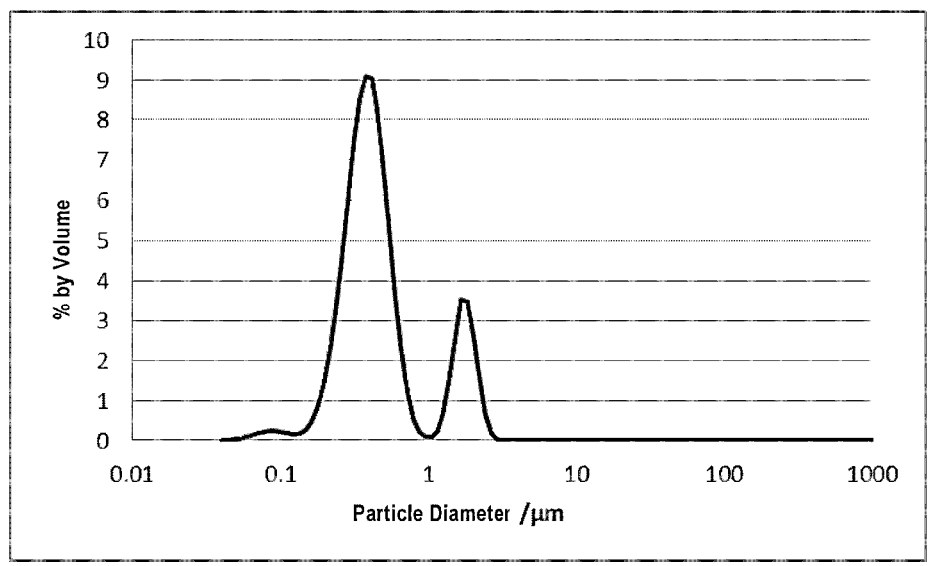

[FIG. 7]
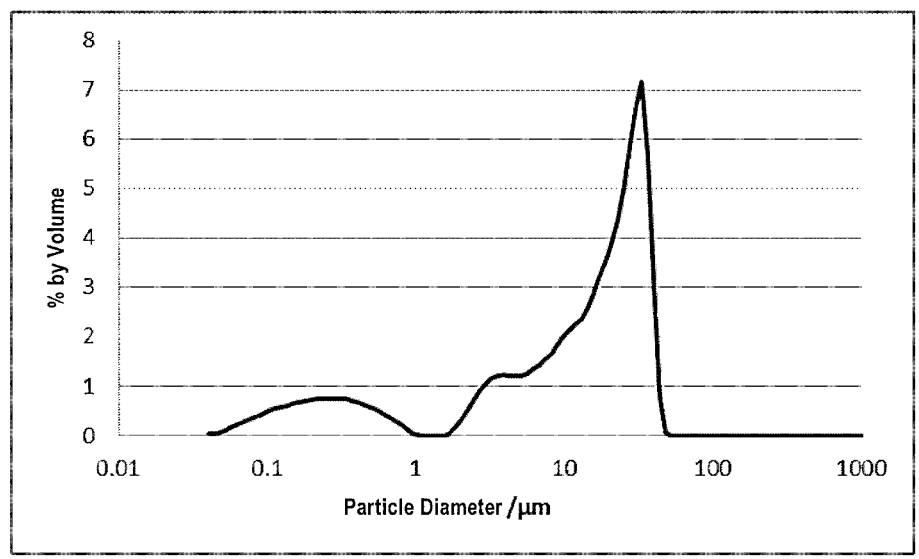

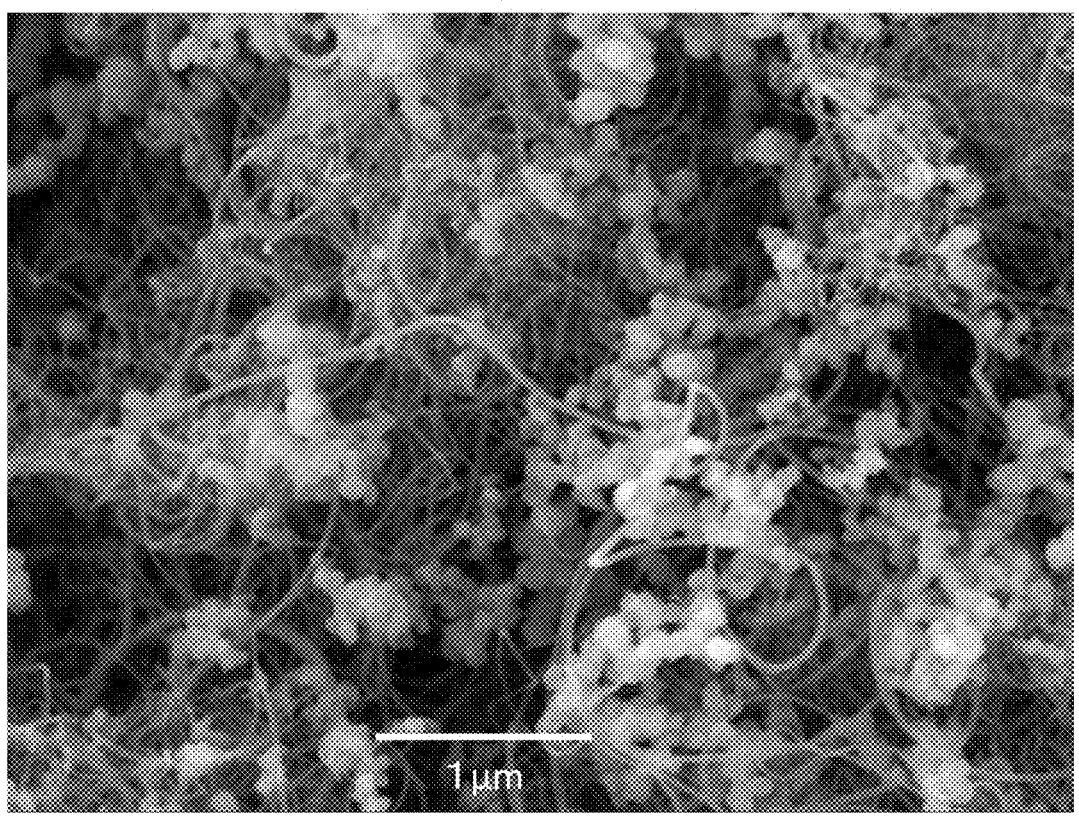
[FIG. 8]

METHOD FOR PRODUCING CARBON NANOFIBER COMPOSITE AND CARBON NANOFIBER COMPOSITE

CROSS-REFERENCE TO RELATED APPLICATIONS

The present application is a divisional application of U.S. application Ser. No. 15/753,138. Filed Aug. 28, 2018, now U.S. Pat. No. 11,208,741, which is a 371 application of International Application No. PCT/JP2016/0711088, filed Jul. 15, 2016, which claims priority to Japanese Patent Application No. JP2015-160699, filed Aug. 17, 2015, of which the disclosure of each is hereby incorporated by reference in its entirety.

TECHNICAL FIELD

The present invention relates to a method for producing a carbon nanofiber composite. The present invention also relates to a carbon nanofiber composite.

BACKGROUND ART

Acetylene black, carbon nanofibers (hereinafter referred to as CNFs) and mixtures thereof, which are conductive carbon materials, are used as fillers for imparting conductivity to resins or as conductivity-imparting materials for various batteries, particularly electrodes of lithium ion batteries. In particular, the CNFs are attracting attention, because the CNFs are characterized by providing higher electrical conductivity regardless of a relatively low content of the conductive carbon material when the CNFs are used or added. Here, the CNFs generally have an outer diameter of from 5 to 100 nm and an aspect ratio showing a ratio of fiber length to outer diameter of 10 or more.

An electrode discharge method, a catalytic vapor growth method, a laser method, and the like are conventionally used for producing the CNFs. Among them, the catalytic vapor growth method would be most suitable as an industrial production method. In the catalytic vapor growth method, the CNFs are grown from catalyst particles at an elevated temperature of generally 700 to 900° C. by bringing transition metal particles as a catalyst into contact with a raw material gas that is a carbon source such as acetylene and benzene. This method is attracting attention as a method of providing CNFs having high purity and high quality at a relatively low temperature.

The catalytic vapor growth method cause a problem that when it is carried out using a solid catalyst in a fixed bed reactor, then it will be difficult to obtain uniform CNFs due to non-uniform contact of the catalyst with the gas or difficulty in equalizing the temperature, so that entanglement of the resulting CNFs progresses to decrease dispersibility. To solve this problem, prior arts proposes that a fluidized bed reactor is used (Patent Documents 1 and 2).

Prior arts also proposes a method for producing CNFs by bringing a carbon-containing gas, a catalyst and previously produced CNFs, during reaction, into contact with one another in a mechanically agitating reactor, and illustrates reactors such as a reactor including stirring blades, a rotary reactor and a rotary kiln type reactor (Patent Documents 3 and 4). In this case, it is also difficult to mechanically and uniformly fluidize the catalyst. For example, a prior art proposes that a fluidizing material such as an inorganic oxide is used (Patent Document 5).

CITATION LIST

Patent Document 1: Japanese Patent No. 3369996 B
Patent Document 2: Japanese Patent Application Publication No. 2010-030887 A
Patent Document 3: Japanese Patent Application Publication No. 2006-045051 A
Patent Document 4: Japanese Patent Application Publication No. 2008-056523 A
Patent Document 5: Japanese Patent Application Publication No. 2011-213518 A

SUMMARY OF INVENTION

Technical Problem

When carrying out the reaction in the fluidized bed, the catalyst and the produced CNFs have very different fluidities by the gas so that a significant difference is created between fluidity of the catalyst alone and the fluidity of the mixture of CNFs and the catalyst when the CNFs are produced, whereby it will be difficult to steadily maintain the catalyst and the produced CNFs in the reactor, or it will be necessary to recover and recycle the CNFs/catalyst discharged from the reactor accompanying with the gas flow, or it will be necessary to provide improvement for imparting appropriate fluidity to the catalyst. That is, there is a problem that the process window becomes narrower in terms of selection of catalysts and conditions for stably fluidizing the catalyst and the CNFs. The catalytic vapor growth method may also be modified to supply a gaseous catalyst precursor instead of the solid catalyst to form a catalytic metal species in the reactor, but it is concerned that the catalytic metal species is deposited on the previously produced CNFs, and the growing of CNFs from this state results in branched CNFs, thereby decreasing dispersibility. Also, when the fluidizing materials are used, these fluidizing materials must be separated from the CNFs after the reaction.

On the other hand, when the CNFs are used as a filler for imparting conductivity to a matrix such as a resin or when they are used as a conductivity imparting agent for a lithium ion battery, the dispersibility of the CNFs are important. However, fine carbon fibers such as conventional carbon nanofibers are complicatedly twisted together to form a secondary structure and have poor dispersibility. Further, when the CNFs are used alone, the expensive CNFs are often diluted with other carbon materials such as carbon black, but efficient dilution is also difficult due to the poor dispersibility of the CNFs. Therefore, it is considered that when the CNFs are used, they are mechanically dispersed beforehand in a jet mill, a ball mill, an ultrasonic homogenizer or the like, or they are chemically dispersed by oxidization with nitric acid or the like, but its cost is higher than the price of the CNFs, which may be economically disadvantageous. Further, there is also a problem that these strong dispersing treatments cause breakage or oxidation of the CNFs, whereby the important electric conductivity may be deteriorated.

In the future, various conductive materials will be required depending on the applications. Then, a composite made of heterogeneous carbon materials would provide various conductive properties depending on its shape and proportion. Particularly, CNFs with a larger aspect ratio (a ratio of length to diameter) has improved conductivity imparting performance, and a combination the CNFs and a conventional inexpensive carbon material such as carbon black would be able to provide a possibility that the combination provides a conductive material having improved cost performance. However, since the conventional CNFs have poor dispersibility as described above, it is difficult to uniformly mix the conventional CNFs with other carbon materials by simple mixing. Therefore, there would be a need for a method of efficiently producing a highly dispersible composite made of CNFs and other carbon materials.

In view of the above problems and actual circumstances, an object of the present invention is to provide a method for a carbon nanofiber composite, which can obtain a carbon nanofiber composite with high productivity and high activity, and which does not require removal of fluidizing materials or dispersing materials. Another object of the present invention is to provide a carbon nanofiber composite having improved dispersibility.

Solution to Problem

In one aspect, the present invention provides a method for producing a carbon nanofiber composite, comprising bringing at least one catalyst and at least one particulate carbon material into contact with at least one gas containing at least one gaseous carbon-containing compound while mechanically stirring the at least one catalyst and the at least one particulate carbon material in a reactor.

In another aspect, the present invention provides a carbon nanofiber composite comprising carbon nanofibers and at least one particulate carbon material, wherein the carbon nanofiber composite comprises 70% by volume of particles with a particle diameter of 1 µm or less and/or a median diameter D50 by volume of 1 µm or less.

Advantageous Effects of Invention

According to the present invention, there is provided a method for producing a carbon nanofiber composite including carbon nanofibers and at least one particulate carbon material with high productivity and activity. Since the carbon nanofiber composite according to the present invention can exhibit high dispersibility and high conductivity, the carbon nanofiber composite improves the conductive network and thus can be suitably used as a conductive filler or a conductivity imparting material.

BRIEF DESCRIPTION OF DRAWINGS

FIG. 1 shows a schematic view of a horizontal rotary reactor used in Examples.

FIG. 2 is an end view taken along the line A-A' of FIG. 1.

FIG. 3 shows a TEM photograph of a CNF portion in the CNF composite obtained in Example 1.

FIG. 4 shows a TEM photograph of a CNF portion in the CNF composite obtained in Example 8.

FIG. 5 shows a TEM photograph of a CNF portion in the CNF composite obtained in Example 9.

FIG. 6 shows a result of dispersibility evaluation (a graph showing a frequency distribution of % by volume versus particle diameter) of a CNF composite obtained in Example 1.

FIG. 7 shows a result of dispersibility evaluation (a graph showing a frequency distribution of % by volume versus particle diameter) of a CNF composite obtained in Comparative Example 1.

FIG. 8 shows an example of a SEM photograph of a CNF composite obtained in Example 2.

DESCRIPTION OF EMBODIMENTS

Definition of Terms

The term "carbon nanofiber" (CNF) as used herein refers to a carbon nanofiber having an average outer diameter of from 5 to 100 nm, an aspect ratio showing a ratio of a fiber length to an average outer diameter of 10 or more, also including a multi-walled carbon nanotube (MWCNT), and more preferably a carbon nanofiber mainly based on the multi-walled carbon nanotube. Here, the fiber length is a length of CNF to be measured. Even if the CNF is bent, the fiber length is determined by measuring the length of the tube along its shape. The lengths of arbitrary 100 or more CNFs are measured from a photograph obtained by TEM (transmission electron microscope) or SEM (scanning electron microscope), and a number average length for the measured lengths is determined. The outer diameter refers to a length of a line segment that can penetrate the CNF to be measured, among line segments in the direction perpendicular to the direction of the fiber length. In the present invention, the average outer diameter of CNFs can be determined, for example, by measuring the outer diameters at arbitrary 30 positions from a photograph obtained by TEM for one CNF to be measured, and calculating an average value for the measured outer diameters.

The definition of the carbon nanofiber (CNF) as used herein includes a single-walled carbon nanotube (SWCNT) and a multi-walled carbon nanotube (MWCNT). Also included are a non-hollow cup-stacked nanofiber and a platelet nanofiber. Although the single-walled carbon nanotube is characterized by exhibiting high conductivity, the nanotube has practical problems that it has isomers due to chirality and has a bundle structure. The cup-stacked nanofiber and platelet nanofiber have lower conductivity than that of the carbon nanotube. Therefore, the multi-walled carbon nanotube (MWCNT) is most preferable as the carbon nanofiber (CNF) in the present embodiments. FIG. 3 shows a TEM photograph of the CNF synthesized in Example 1 as a representative example of the carbon nanofibers according to the present invention. It shows that the carbon nanofiber is the multi-walled carbon nanotube.

The term "synthesis activity" as used herein refers to a mass of the CNFs obtained per unit time per unit active species mass. The catalytic activity refers to a mass of the CNFs obtained per unit time per unit catalyst mass. The productivity refers to a mass of the CNFs obtained per unit catalyst mass.

According to the present invention, the following carbon nanofiber composites and methods for producing the same are illustratively provided:

(1) A method for producing a carbon nanofiber composite, comprising bringing at least one catalyst and at least one particulate carbon material into contact with at least one gas containing at least one gaseous carbon-containing compound while mechanically stirring the catalyst and the particulate carbon material in a reactor.

(2) The method for producing the carbon nanofiber composite according to the aspect (1), wherein the reactor comprises a rotary reactor.

(3) The method for producing the carbon nanofiber composite according to the aspect (1) or (2), wherein the particulate carbon material comprises 70% by volume or more of particles with a particle diameter of 1 µm or less, and/or a median diameter D50 by volume of 1 µm or less.

(4) The method for producing the carbon nanofiber composite according to any one of the aspects (1) to (3), wherein the particulate carbon material comprises one or more selected from graphite, carbon black, and graphene.

(5) The method for producing the carbon nanofiber composite according to any one of the aspects (1) to (4), wherein the gaseous carbon-containing compound comprises carbon monoxide.

(6) The method for producing the carbon nanofiber composite according to any one of the aspects (1) to (5), wherein the method comprises carrying out the reaction at a temperature ranging from 550° C. to 900° C. in the reactor.

(7) The method for producing the carbon nanofiber composite according to any one of the aspects (1) to (6), wherein the catalyst comprises one or more of the following (A), (B) and (C):

(A) a catalyst in which an active species mainly based on cobalt is supported on a support comprising an oxide containing magnesium;

(B) a catalyst in which an active species mainly based on cobalt is supported on a support comprising an oxide containing titanium; and (C) a catalyst in which an active species mainly based on any of iron and nickel is supported on a carbon particle support.

(8) The method according to any one of the aspects (1) to (7), wherein the method comprises allowing the gas containing the gaseous carbon-containing compound to flow such that the gaseous carbon-containing compound flows through the reactor at a flow rate of 0.1 NL/g-active species•minute or more.

(9) The method for producing the carbon nanofiber composite according to any one of the aspects (1) to (8), wherein the gas containing the gaseous carbon-containing compound further comprises hydrogen.

(10) A carbon nanofiber composite comprising carbon nanofibers and at least one particulate carbon material, wherein the particulate carbon material comprises 70% by volume or more of particles with a particle diameter of 1 µm or less, and/or a median diameter D50 by volume of 1 µm or less.

(11) The carbon nanofiber composite according to the aspect (10), wherein the carbon nanofiber composite comprises from 10 to 90% by mass of the carbon nanofibers.

(12) The carbon nanofiber composite according to the aspect (10) or (11), wherein the particulate carbon material comprises carbon black.

(13) A method for removing a residual catalyst, comprising subjecting the carbon nanofiber composite according to any one of the aspect (10) to (12) to a heat treatment in an inert gas atmosphere at a temperature of 1500° C. or higher and 2500° C. or lower.

(14) A conductive resin composition comprising the carbon nanofiber composite according to any one of the aspects (10) to (12).

(15) A dispersion, an ink or a paint comprising the carbon nanofiber composite according to any one of the aspects (10) to (12).

Reactor

The reactor that can be used in the present invention is not particularly limited as long as it is a reactor which has any shape capable of accommodating the catalyst and the particulate carbon material in a gas atmosphere containing the carbon-containing compound, and which has a function of mechanically stirring the catalyst and the particulate carbon material by mechanical operation of a part or the whole of the reactor. A movable part(s) of the reactor may be a stirring blade(s), a paddle(s) or the like, or the reactor itself may rotate or vibrate. An example of the latter may be a rotary kiln reactor. The concept of "a reactor which has a function of mechanically stirring" as used herein does not include any concept of a fluidized bed reactor in which a catalyst or the like is dispersed by a fluid such as a gas. In addition to the above problems, the use of the fluidized bed reactor results in easy separation of the particulate carbon material and the CNFs due to the difference in fluidity between the particulate carbon material and the CNFs, so that it may be difficult to obtain a carbon nanofiber composite having a desired composition. In the present invention, the reactor which has a function of mechanically stirring may preferably be a rotary reactor, and more preferably a horizontal rotary reactor which may have a slight gradient, such as the rotary kiln reactor. The catalyst and the granular carbon material in the reactor are mechanically stirred, whereby they can be brought into contact with the carbon-containing gas as a raw material, with high uniformity. Further, the particulate carbon material serves to inhibit aggregation of the produced CNFs, because the particulate carbon material is stirred together with the produced CNFs. The reaction in this reactor may be batch type or continuous type.

Gas Containing Gaseous Carbon-Containing Compound

In the present invention, the gaseous carbon-containing compound in the gas containing the gaseous carbon-containing compound plays a role as a material for reaction and can be converted to CNFs by catalysis. Examples of the carbon-containing compound that can be used include, but not limited to, a hydrocarbon having from 1 to 10 carbon atoms, carbon monoxide, carbon dioxide and mixtures thereof. Examples of the hydrocarbon include methane, ethane, propane, ethylene, propylene, benzene, toluene and acetylene. In the present invention, carbon monoxide is most preferably used. By using carbon monoxide, CNFs having high crystallinity and high conductivity can be produced even at a relatively low reaction temperature.

The gas containing the gaseous carbon-containing compound may contain other components, in particular, components for modifying the properties of CNFs and components for improving productivity during production. For example, it may contain an inert gas such as nitrogen and argon, or it may contain hydrogen capable of suppressing deactivation of the catalyst and improving productivity. The molar fraction of hydrogen in the gas containing the gaseous carbon-containing compound may preferably be 0.1% or more, and more preferably 1% or more, and still more preferably 3% or more. Further, the total molar fraction of the gaseous carbon-containing compound in the gas containing the gaseous carbon-containing compound may preferably be 50% or more, in terms of providing higher synthesis activity.

Particulate Carbon Material

The particulate carbon material used in the present invention can serve as a fluidizing dispersant for increasing the catalytic activity and productivity during the production of CNFs and improving the dispersibility of CNFs. Various carbon materials can be used according to the purposes. In the particulate carbon material, particles each having a particle diameter of 1 µm or less may preferably account for 70% by volume or more, and more preferably 80% by volume or more, and even more preferably 90% by volume or more, in terms of improving the dispersibility of CNFs and CNF composite. Further, in the particulate carbon material, a median diameter D50 by volume may preferably be 1 µm or less, and more preferably 0.5 µm or less, in terms of improving the dispersibility of CNFs.

The dispersibility may be evaluated by any known method. Preferably, in the present invention, the fraction of volume occupied by the particles each having a particle diameter of 1 µm or less in the particulate carbon material and the median diameter D50 by volume of the particulate carbon material can be adopted as the dispersibility evaluation method. These are measured by the same method as that of a dispersibility evaluation method of the CNF composite as described above.

Standardized Pretreatment for Measuremen]

6 mL of an aqueous solution of 0.1% by mass of sodium carboxymethyl cellulose (CMCNa) is prepared, and a dispersion solution is prepared such that a concentration of the particulate carbon material in the aqueous solution is 0.1% by mass. Using an ultrasonic homogenizer (for example, Smurt NR 50-M from Microtec Co., Ltd.;•frequency: 20 kHz; output: 50 W), the dispersion solution was subjected to ultrasonic irradiation for 40 seconds under conditions of an auto power mode and output of 50%, suspended and homogenized to prepare a sample solution.

Particle Size Distribution Measuremen]

The sample solution is then subjected to particle size distribution measurement according to the laser diffraction/scattering method (ISO 13320: 2009).

As with measurement of the CNF composite as described below, the samples (the particulate carbon materials or comparative samples) used in this measurement are not subjected to any dispersion treatment other than the above standardized pretreatment for measurement.

The particulate carbon materials satisfying the above conditions can be suitably used in the present invention, and specific preferable examples include carbon black, graphene and graphite. Examples of carbon black include acetylene black, furnace black, and ketjen black. The acetylene black is available from Denki Company Limited, Ketjen black is available from Lion Corporation, and the furnace black is available from TIMCAL ltd., Mitsubishi Chemical Corporation, or Tokai Carbon Co., Ltd. These carbon blacks may be denatured, modified or doped with boron, nitrogen or the like. As the graphene, a known substance may be used. The examples of the graphite include natural graphite or artificial graphite, which is fine graphite satisfying the above the median diameter condition. Examples of natural graphite include massive graphite, scaly graphite and earthy graphite, but graphite particles derived from these may be used. Natural graphite purified to improve the purity or flaked graphite may also be preferably used. Particulate graphite derived from the natural graphite is for example available from Nippon Graphite. Examples of the artificial graphite particles include those made from coke, pitch, coal tar, or resins. This category also includes mesophase carbon and glassy carbon. The particulate graphite derived from the artificial graphite is available from, for example, Tokai Carbon Co., Ltd., Hitachi Chemical Co., Ltd., Showa Denko, K.K, or Nippon Graphite. These graphite particles can be suitably used even for those used as negative electrode materials of lithium ion batteries. The carbon black is most preferably used in the present invention. When the carbon black is used, the CNF composite having very improved dispersibility can be obtained due to good dispersibility of carbon black used.

The concept of the particulate carbon material in the present invention does not include fibrous carbon such as carbon fibers, activated carbon fibers or carbon nanofibers (CNFs). When these fibrous carbons are used as fluidizing dispersants, the intervening fibrous carbon is entangled in CNFs grown by the catalytic reaction, so that the dispersibility of the resulting CNF composite may be decreased. More particularly, in the present invention, the particulate carbon material may preferably have a ratio (aspect ratio) of a long diameter to a short diameter in a range of from 1 to less than 10. Here, the long diameter refers to a length of the longest line segment that can penetrate the carbon material to be measured, and the short diameter refers to a length of the longest line segment that can penetrate the carbon material to be measured, among line segments in the direction perpendicular to the long diameter. These particulate carbon materials may form a structure in which primary particles of the particulate carbon material are in contact with and bonded to each other.

Catalyst

In the producing method according to the present invention, a known catalyst for CNF synthesis may be used. Even if a catalyst for CNF synthesis that cannot obtain CNFs with good dispersibility in the conventional synthesis in the fixed bed or synthesis under mechanical stirring is used, the catalyst can produce a CNG composite with more improved dispersibility when used in the method according the present invention.

It is preferable to employ, among the catalysts for CNF synthesis, one or more catalysts selected from the following catalysts (A) to (C) that can produce relatively high dispersible CNFs even in the conventional producing method. When synthesizing CNFs by the catalyst alone, the production conditions for the CNFs will be limited even if the catalyst can provide highly dispersible CNFs, and the activity is also relatively low. For example, the conditions under which highly dispersible CNFs are obtained may be those which sacrifice the original high CNF productivity per catalyst. According to the method of the present invention, it is possible to efficiently produce the CNF composite having improved dispersibility under higher CNF productivity conditions and to widely expand the process window therefor.

Catalyst A

Catalyst A is a catalyst for producing carbon nanofibers, in which an active species mainly based on cobalt is supported on a support composed of an oxide containing magnesium (the oxide is a concept including a complex oxide) (hereinafter, the catalyst is referred to as "cobalt-magnesium oxide supported catalyst").

Active Species of Catalyst A

The cobalt-magnesium oxide supported catalyst according to the present invention is mainly based on cobalt as a substantial active species for CNF production. Cobalt may be in the form of not only metallic cobalt but also in the form of a compound such as an oxide, hydroxide, hydrous oxide, nitrate salt, acetate salt, oxalate salt and carbonate salt. The active species may contain an element(s) of Groups 4 to 12 as a component(s) other than cobalt. These include the Iron Group such as iron and nickel; manganese; and molybdenum. However, it is preferable that at least 60 mol % or more, and preferably 80 mol % or more, and most preferably 90 mol % or more, of the component of Groups 4 to 12 contained as an active species of the catalyst is the cobalt component (in mol % of cobalt element). As other active species, an element(s) of Groups 1 to 3 or Group 14 may be contained.

Support for Catalyst A

As a support on which the active species is supported, an oxide containing magnesium having a specific surface area of from 0.01 to 5 m²/g may be preferably used. Examples of the oxide containing magnesium include spinel oxides and perovskite oxides containing magnesium oxide or magnesium, and the like. Among them, magnesium oxide is most preferable as the support. The specific surface area of the oxide containing magnesium may more preferably be from 0.01 to 4 m²/g, and still more preferably from 0.03 to 3 m²/g. If the specific surface area is less than 0.01 m²/g, the crystallinity and electrical conductivity of the resulting CNFs may be reduced. If the specific surface area exceeds 5 m²/g, the synthesis activity and dispersibility of the resulting CNFs may be deteriorated. The support may contain an oxide(s) of other metal element(s) selected from Groups 1 to 3 and Group 14. The content of the oxide containing magnesium in the support may preferably be at least 50% by mass or more, and more preferably 90% by mass or more, and most preferably 98% by mass or more. If the oxide containing magnesium is less than 50% by mass, the synthesis activity may be decreased.

As the rate of supported cobalt increases, the catalytic activity tends to increase and the crystallinity of the resulting CNFs tends to be improved. However, if the rate of supported cobalt is too large, the particle diameter of cobalt is increased and the synthesis activity may be decreased. On the other hand, if the rate of supported cobalt is small, the synthesis activity is increased but the catalytic activity tends to be decreased, and the crystallinity or the conductivity of the resulting CNFs may be decreased. Therefore, the rate of cobalt supported on the support may arbitrary, but preferably be from 3 to 150% by mass, and most preferably from 5 to 90% by mass. It should be noted that the supported rate herein, including the cases of catalyst B and catalyst C, is calculated based on the following equation:

supported rate=mass of active species(as metal component)/mass of support×100(%).

When supporting cobalt on the support, the supporting method is not particularly limited. For example, cobalt can be supported on the support by impregnating the support with a non-aqueous solution (for example, an ethanol solution) or an aqueous solution in which a salt of cobalt is dissolved, or a mixed solution thereof, sufficiently dispersing and mixing it, and then drying it, and firing it in air at an elevated temperature (for example, from 300 to 600° C.). Alternatively, the support may be simply impregnated with a non-aqueous solution (for example, ethanol) or an aqueous solution in which a salt of cobalt is dissolved, sufficiently dispersed and mixed, and then subjected to moisture removal and dried. Alternatively, the support may be impregnated with a non-aqueous solution or an aqueous solution in which a salt of cobalt is dissolved, sufficiently dispersed and mixed, and then neutralized with alkali, subjected to moisture removal, dried and fired. A method such as spray drying may be used for drying.

When using this catalyst, the reaction temperature for synthesizing CNFs is as follows, particularly preferably 600° C. or more and 750° C. or less.

Catalyst B

Catalyst B is a catalyst in which an active species mainly based on cobalt is supported on an oxide containing titanium (the oxide is a concept including a complex oxide) (hereinafter, the catalyst is referred to as "cobalt-titanium oxide supported catalyst").

Active Species of Catalyst B

The cobalt-titanium oxide supported catalyst according to the present invention is mainly based on cobalt as a substantial active species for CNF production. The description of the active species of the catalyst B is the same as that of the active species of the catalyst A, including the preferred embodiments.

Support for Catalyst B

The support that can be preferably used includes an oxide containing titanium and having a specific surface area of from 20 to 140 m²/g. Examples of the oxide containing titanium include spinel oxides and perovskite oxides containing titanium oxide or titanium, and the like. Among them, titanium oxide is most preferable as the support. The specific surface area may more preferably be from 25 to 100 m²/g, and still more preferably from 40 to 70 m²/g. The specific surface area of 20 m²/g or more leads to improved synthesis activity. Further, the specific surface area of 140 m²/g or less provides an advantage that high synthesis activity can be obtained. When titanium oxide is used as the support, the support may be titanium oxide alone or a mixture with other oxides. Titanium oxide may preferably have a rutile crystal structure or a mixed structure of a rutile structure and an anatase structure, in view of providing high synthesis activity, but it may have an anatase structure. Examples of the complex oxide containing titanium include potassium titanate, barium titanate, strontium titanate, calcium titanate, magnesium titanate, lead titanate, aluminum titanate and lithium titanate. Among them, barium titanate may be preferred because it can lead to high synthesis activity. When the complex oxide containing titanium is used as the support, the support may be the complex oxide alone or a mixture with other oxides. The proportion by mass of the oxide containing titanium in the support may preferably be at least 50% by mass, and more preferably 90% by mass or more, and most preferably 98% by mass or more. The content of the oxide containing titanium of 50% by mass or more can allow improvement of conductivity, crystallinity and the like.

The higher the rate of supported cobalt, the higher the yield of CNFs will be. However, if the supported rate is too high, the particle size of cobalt will increase and the CNFs produced will become thick, so that the synthesis activity per an active species tends to decrease. On the other hand, if the rate of supported cobalt is small, the particle size of the supported cobalt will become small and fine carbon nanotubes will be obtained, but the synthesis activity per a catalyst tends to be decreased. The optimal rate of supported cobalt will vary depending on the pore volume, the outer surface area and the supporting method of the support, but it may preferably be from 0.1 to 50% by mass, and more preferably 1 to 40% by mass, and most preferably 5 to 30% by mass. The rate of supported cobalt of 0.1 to 50% by mass improves the synthesis activity per a catalyst and provides an advantage of cost.

When supporting cobalt on the support, the supporting method is not particularly limited. For example, the active species can be supported on the support by impregnating the support with a non-aqueous solution (for example, an ethanol solution) or an aqueous solution in which a salt of cobalt is dissolved, or a mixed solution thereof, sufficiently dispersing and mixing it, and then it to moisture removal and firing it in air (for example, at a temperature of from 300 to 700° C.). Alternatively, the support may be simply impregnated with a non-aqueous solution (for example, ethanol) or an aqueous solution in which a salt of cobalt is dissolved, sufficiently dispersed and mixed, and then subjected to moisture removal and dried. Alternatively, the support may be impregnated with a non-aqueous solution or an aqueous solution in which a salt of cobalt is dissolved, sufficiently dispersed and mixed, and then neutralized with alkali, subjected to moisture removal, dried and fired. A method such as spray drying may be used for drying.

When using the catalyst, the reaction temperature for synthesizing CNFs is as follows, particularly preferably 600° C. or more and 750° C. or less.

Catalyst

Catalyst C is a catalyst in which an active species mainly based on any of iron and nickel is supported on a carbon particle support.

Active Species of Catalyst C

As the active species of the catalyst, an active species mainly based on any of iron and nickel is used. Here, iron and nickel may be in the form of not only a metal but also a compound such as an oxide, hydroxide, hydrous oxide, nitrate salt, acetate salt, oxalate salt and carbonate salt.

However, preferably 70% by mass or more, and more preferably 95% by mass or more, of components excluding the support may be preferably composed of iron and nickel (a total value as metal components of both), from the viewpoint that the active species of the catalyst mainly based on any of iron and nickel suitably functions. By fulfilling this condition, CNFs having relatively high crystallinity, high conductivity and high dispersibility can be obtained with higher CNF synthesis activity.

When using the catalyst of the active species mainly based on any of iron and nickel, the resulting CNFs will be substantially carbon nanotubes (CNTs). On the other hand, when the active species is mainly based on iron, the resulting CNFs will mainly contain a herringbone structure. The active species mainly based on any of iron and nickel may be preferred, because the resulting CNFs preferably have the carbon nanotube (CNT) structure, considering that it provides higher conductivity (lower volume resistivity) and higher crystallinity, particularly in view of the mechanical strength as fibers.

When the active species is mainly based on iron and nickel, the active species may have any mass ratio of iron to nickel. When the active species is mainly based on any of iron and nickel, the crystallinity and dispersibility of the resulting CNFs are improved. The most preferable ratio of iron to nickel in the case of using the catalyst C may be in a range of Fe:Ni=6:4 to 4:6. When the composition of the active species is in this range, the resulting CNFs can exhibit extremely higher dispersibility together with higher conductivity and crystallinity.

Components that may be contained in a small amount, other than iron and nickel, includes cobalt, manganese, molybdenum, copper, and tungsten, and it is not excluded that components of Groups 1 to 3 or Group 14 are also contained.

Support for Catalyst C

As the support, carbon particles each having a specific surface area of from generally 0.01 to 200 $m^2/g$, preferably from 0.1 to 20 $m^2/g$, are used. Here, the carbon particles that can be illustrated include graphite particles, various carbon blacks and the like, preferably graphite particles, more particularly natural graphite or artificial graphite. By using such carbon particles as the support, very high CNF synthesis activity can be obtained and the CNF-carbon material composite can be efficiently obtained. In contrast to the ordinary metal oxide based supports, the use of the conductive carbon particles as the support results in a CNF-carbon material composite having excellent conductivity without removing the support from the resulting CNFs.

It is preferable that the carbon particle as used herein have a ratio (aspect ratio) of a long diameter to a short diameter in a range of from 1 to less than 10. The long diameter refers to a length of the longest line segment that can penetrate the graphite material to be measured, and the short diameter refers to a length of the longest line segment that can penetrate the graphite material to be measured, among line segments in the direction perpendicular to the long diameter. The carbon particles may form a structure in which the particles are brought into contact with and bound to each other. Therefore, the concept of the carbon particles does not include carbon materials having structures other than the particulate structure, such as carbon fibers, activated carbon fibers and carbon nanofibers (CNFs). When the carbon material having a structure other than the particulate structure is used as the support, the resulting CNFs and these materials may be entangled with each other, so that the dispersibility may be lowered.

Surprisingly, the CNF-carbon material composite having excellent dispersibility can be obtained by using graphite particles each having a specific surface area of, most preferably, from 0.1 to 20 $m^2/g$ as the support for the above active species. The reason would be that the CNFs directly obtained by the CNF synthesis reaction using the catalyst C is essentially highly dispersible and has less interaction with the graphite particle support, for example, less entanglement. Further, the use of such a graphite particle support provides an advantage that the metal active species is easily separated from the support due to lower bonding strength to the metal active species.

On the other hand, if the carbon particles each having a specific surface area of less than 0.1 $m^2/g$ or more than 20 $m^2/g$, for example carbon black, are used, high activity may not be obtained. More particularly, if the specific surface area is less than 0.1 $m^2/g$, the supported metal catalyst is insufficiently dispersed so that the activity tends to be decreased. On the other hand, if the specific surface area exceeds 20 $m^2/g$, the synthesis activity of the CNFs is decreased, so that there is concern that entanglement between the resulting CNFs or the CNFs including the support becomes intense and the dispersibility is lowered.

Examples of preferable natural graphite include massive graphite, scaly graphite and earthy graphite, and graphite particles derived from these may also be used. For example, it is preferable to use natural graphite or flaked graphite purified to improve purity. Particulate graphite derived from natural graphite can be obtained from Nippon Graphite, for example. The artificial graphite particles that can be suitably used include those which are produced from coke, pitch, coal tar and resins and which satisfy the above specific surface area. This category also includes mesophase carbon and glassy carbon. The particulate graphite derived from the artificial graphite can be available from, for example, Tokai Carbon Co., Ltd., Hitachi Chemical Co., Ltd., Showa Denko, K.K, or Nippon Graphite. These graphite particles can be suitably used, including those used as negative electrode materials of lithium ion batteries.

When supporting the active species on the support, the supporting method is not particularly limited and any known method may be used. For example, the active species can be supported on the graphite particle support by impregnating the graphite particle support with a non-aqueous solution (for example, an ethanol solution) or an aqueous solution in which a metal salt is dissolved, or a mixed solution thereof, sufficiently dispersing and mixing it, and then subjecting it to moisture removal and drying it. Alternatively, the graphite particle support may be impregnated with a non-aqueous solution or an aqueous solution in which a metal salt is dissolved, sufficiently dispersed and mixed, and then neutralized with alkali, subjected to moisture removal and dried.

A method such as spray drying may be used for drying. Other methods are described, for example, in "Catalyst Preparation Handbook", supervised by Masakazu Iwamoto, Apr. 25, 2011, issued by the Catalysis Society of Japan NTS.

The rate of the active species supported on the graphite particle support may vary depending on the pore volume of the support, the outer surface area and the supporting method, and may generally be from 1 to 50% by mass. If the supported rate is less than 1% by mass, the synthesis activity tends to be decreased. On the other hand, if the supported rate exceeds 50% by mass, the CNFs produced will become thicker or the synthesis activity may be decreased. The supported rate may most preferably be from 1 to 10% by mass, in terms of the synthesis activity.

When using the catalyst, the reaction temperature for synthesizing CNFs is as follows, particularly preferably 550° C. or more and 650° C. or less.

By using the catalyst selected from these preferred catalysts (A), (B) and (C) and carrying out the synthesis under suitable reaction conditions for each catalyst, CNFs having high crystallinity, high conductivity and high dispersibility can be obtained. These characteristics can also be achieved in the CNFs obtained by carrying out the synthesis reaction without using the fluidizing dispersant made of the granular carbon material. However, the conditions for producing the CNFs alone having these characteristics are limited, and synthesis activity is also not sufficient. There is a problem that the dispersibility is significantly deteriorated particularly when one of the conditions is not satisfied. There is also a problem that the dispersibility of the CNFs and the synthesis activity or productivity of the CNFs are in a trade-off relationship, so that the activity or productivity are lowered when attempting to improve the dispersibility. The producing method according to the present invention can produce a highly dispersible CNF composite, in which by using the catalyst selected from those catalysts (A) to (C) capable of providing CNFs with high crystallinity, high conductivity and high dispersibility, the CNF composite having higher conductivity and dispersibility can be produced with higher activity and productivity.

In addition to the catalysts (A), (B) and (C) suitably used in the present invention, catalysts that can be used in the present invention are known catalysts for CNF synthesis. When using these known catalysts, a gas containing a gaseous carbon-containing compound suitable for each catalyst can be used as a raw material. Further, as reaction conditions, those suitable for each of those catalysts can be appropriately selected from the reaction condition ranges as shown below.

Reaction Conditions of CNF

In one embodiment of the method for producing the carbon nanofiber composite according to the present invention, the method includes bringing the catalyst and the particulate carbon material into contact with at least one gas containing at least one gaseous carbon-containing compound while mechanically stirring the catalyst and the particulate carbon material in a reactor to produce a composite of carbon nanofibers and the particulate carbon material.

The catalyst and the particulate carbon material may be mixed at any mixing ratio in the reactor, depending on the type of the catalyst and the support, the rate of supported active species and the like.

The total pressure of the gas containing the gaseous carbon-containing compound may preferably be 0.98 MPa or less, and more preferably 0.5 MPa or less, and still more preferably 0.3 MPa or less. When the total pressure is more than 0.98 MPa, the costs and utilities of the pressure facility equipment will be increased for the production. Further, when the pressure is greatly reduced as compared with 0.1 MPa (atmospheric pressure), for example, when it is less than 0.08 MPa, it is difficult to seal the high temperature reactor for preventing atmospheric (oxygen) contamination, which may be preferable. Therefore, the total pressure of the gas containing the gaseous carbon-containing compound may preferably be 0.03 MPa or more, and more preferably 0.04 MPa or more.

In addition, it is preferable to allow the gas containing the gaseous carbon-containing compound to flow at a predetermined flow rate into the reactor in order to improve the synthesis activity. More particularly, it is preferable to allow the gas containing the gaseous carbon-containing compound to flow into the reactor such that the gaseous carbon-containing compound flows at a flow rate of 0.1 NL/g-active species•minute or more. The flow rate of the gaseous carbon-containing compound may more preferably be 1 NL/g-active species•minute or more. However, if the flow rate of the gaseous carbon-containing compound is excessively increased, the utility cost for preheating will be increased, and the synthesis activity may be conversely lowered. Therefore, the flow rate of the gaseous carbon-containing compound may preferably be 200 NL/g-active species•minute or less, and more preferably 100 NL/g-active species•minute or less. The "NL" represents an amount L (liter) of the gas converted into the standard state (0° C., 1 atm), and the "NL/g-active species•minute" means an amount of the gas per one minute in the presence of a unit active species (per 1 g of active species).

The reaction temperature of the present invention is optional depending on the catalysts used, and may be generally from 550 to 900° C., typically from 600 to 700° C. If the reaction temperature is lower than 550° C., the synthesis activity may be decreased, or the crystallinity, conductivity and dispersibility of CNFs may be decreased. On the other hand, if the temperature is higher than 900° C., the synthesis activity may be decreased.

Production conditions in the case where carbon monoxide that is most suitable as a raw material gas is used will be now exemplarily described. Carbon monoxide used as a raw material may be employed as a mixed gas with carbon dioxide or hydrogen, or may contain an inert gas such as nitrogen gas. When the partial pressure (absolute pressure) of carbon monoxide gas is less than 0.04 MPa, the synthesis activity may be decreased or the crystallinity and conductivity of the resulting CNFs may be decreased. Further, when the partial pressure (absolute pressure) of carbon monoxide gas is higher than 0.98 MPa, the dispersibility of the resulting CNFs may be decreased, or the catalyst may be severely deactivated so that the synthesis activity may be decreased. The partial pressure (absolute pressure) of carbon monoxide may preferably be from 0.04 to 0.98 MPa, and more preferably from 0.05 to 0.3 MPa, and most preferably from 0.05 to 0.1 MPa.

The partial pressure of the hydrogen gas may preferably be from 1 to 100%, and more preferably from 5 to 60%, relative to the partial pressure of carbon monoxide gas. If the partial pressure of the hydrogen gas relative to the partial pressure of the carbon monoxide gas is more than 100%, the synthesis activity may be decreased or the crystallinity and conductivity of the resulting CNFs may be decreased. If the partial pressure of the hydrogen gas is less than 1%, the catalyst may be deactivated in an early stage and the synthesis activity may be decreased.

It should be noted that the partial pressure of the hydrogen gas relative to the partial pressure of the carbon monoxide gas can be calculated by the following equation:

Partial Pressure of Hydrogen Gas relative to Partial Pressure of Carbon Monoxide Gas=Molar Ratio of Hydrogen Gas/Molar Ratio of Carbon Monoxide Gas×100(%).

For example, in the case of a mixed gas whose composition of the raw material gas is $CO/H_2/N_2$=85/15/0 as shown in Table 2, the partial pressure of the hydrogen gas relative to the partial pressure of the carbon monoxide can be calculated as the partial pressure of the hydrogen gas relative to the partial pressure of the carbon monoxide gas=15/85×100=18(%).

It is preferable that the flow rate of the carbon monoxide gas is 0.1 NL/g-active species•minute or more while satisfying the above conditions. The flow rate of the carbon monoxide gas may more preferably be 1 NL/g-active species•minute or more. By setting the flow rate of the carbon monoxide gas to be within this range, the CNFs can be produced with high synthesis activity. Here, the high synthesis activity specifically means 10 g-CNF/g-active species•h (hour) or more. There is no particular upper limit on the flow rate of the carbon monoxide gas, but if it exceeds 200 NL/g-active species•minute, the flow rate of the gas is too high and the utility cost for preheating is increased, which is not preferable. In addition, the synthesis activity may be decreased. Therefore, the flow rate of the carbon monoxide gas may more preferably be 100 NL/g-active species•minute or less.

Prior to the reaction, the catalyst may be reduced with hydrogen or other reducing gases. In this case, hydrogen or other reducing gases may be optionally diluted with an inert gas such as nitrogen. The reduction is preferably carried out at the same temperature as the reaction temperature or in a temperature range of about ±200° C. of the reaction temperature. The reduction of the catalyst prior to the reaction may increase or stabilize the catalytic activity.

Method for Removing Residual Catalyst

The catalyst(s) is/are preferably removed from the CNF composite produced according to the present invention, in order to improve the purity, because, for example, when the carbon nanofiber composite according to the present invention is used as a conductive material for electrodes of various batteries such as lithium ion secondary batteries, it may be necessary to remove residual catalyst. In this case, a known method may be utilized. However, removal of residual catalyst in an aqueous solution such as a residual catalyst dissolution treatment with an acid or the like cause a problem that the carbon nanofiber composite is aggregated and the dispersibility is decreased during drying of the carbon nanofiber composite, or removal of the residual catalyst contained in the carbon is not sufficient. The carbon nanofiber composite according to the present invention can be subjected a heat treatment at a temperature of 1500° C. or higher and 2500° C. or lower in an inert gas to efficiently remove the residual catalyst. Specifically, according to the present invention, it is possible to remove 80% by mass or more of the residual catalyst contained, and preferably 90% by mass or more, that is, the target is a residual catalyst removal rate of 80% by mass or more, and preferably 90% by mass or more. The time of the heat treatment depends on the amount and the state of existence of residual catalyst, and may be optionally changed. It may be usually 30 minutes or more and 6 hours or less. A known heating furnace can be used for the heat treatment, and a graphitization furnace may be suitably used. Examples of the inert gas include argon, nitrogen, helium, and xenon.

Carbon Nanofiber (CNF) Composite

The CNF composite according to the present invention includes carbon nanofibers and at least one particulate carbon material. In one embodiment, the CNF composite according to the present invention can have a structure in which carbon nanofibers and at least one particulate carbon material are intertwined with each other.

The CNF composite according to the present invention can be characterized by the following features:

The CNFs may be contained in any proportion (CNF content) in the CNF composite according to the present invention, and the CNF content may preferably be in a range of from 10 to 90% by mass. If the content is more than 90% by mass, the effect of improving the dispersibility by the particulate carbon material (fluidizing dispersant) may be limited. If the content is less than 10% by mass, the effect of CNFs themselves on the physical properties (impartment of conductivity, and the like) may be limited. The CNF content may more preferably be 20% by mass or more, and still more preferably 30% by mass or more, and even more preferably 40% by mass or more, and even more preferably 50% by mass or more, and still more preferably 60% by mass or more, and still more preferably 70% by mass or more, and still more preferably 80% by mass or more, in terms of producing the effect of CNFs themselves on the physical properties. The CNF content may more preferably be 85% by mass or less, in terms of improving the dispersibility. Here, the CNF content (% by mass) is represented by the equation: Mass of CNF/(Mass of CNF+Mass of Particulate Carbon Material)×100.

The CNF composite according to the present invention can exhibit various conductivities (volume resistivities) depending on the type of the fluidizing dispersant made of the carbon material to be used and the proportion of the fluidizing dispersant contained. As a preferred example, when carbon black is used as the fluidizing dispersant, the volume resistivity measured under a load of 9.8 MPa is generally 0.1 Ω·cm or less. When graphite or graphene is used as the fluidizing dispersant, the volume resistivity measured under a load of 9.8 MPa is generally 0.05 Ω·cm or less.

The CNF composite according to the present invention, more preferably the MWCNT composite, is characterized by exhibiting high dispersibility.

The CNF composite according to the present invention can exhibit higher dispersibility as compared with the conventional commercial CNFs (MWCNTs). Furthermore, the "higher dispersibility" as used herein means that a higher dispersible CNF composite can be obtained as compared with CNFs obtained by a method other than that of the present invention, for example without using the fluidizing dispersant according to the present invention, or as compared with a CNF composite obtained without mechanical stirring. The dispersibility may be evaluated by any known method. For example, the evaluation method includes a method of visually observing a state of a dispersion film formed on a glass wall surface of a vial after stirring a CNF dispersion in the glass vial; a particle size distribution measurement method; a particle size gauge (particle gauge) method; Turbi Online (trade name from EKO Instruments); a precipitation test, a centrifugal sedimentation test, and the like. Preferably, the particle size distribution measurement method is used. Pretreatment for measurement performed prior to the dispersibility evaluation may vary depending on methods and conditions, conditioning of the apparatus, and the like. Therefore, it can be demonstrated that the CNF composite according to the present invention can exhibit higher dispersibility by suitably selecting and optimizing those conditions and the like, as compared with the above commercially available CNFs, and CNFs or a CNF composited obtained by a method other than that of the present invention. A non-limiting example includes the following methods:

Standardized Pretreatment for Measurement 6 mL of an aqueous solution of 0.1% by mass of sodium carboxymethyl cellulose (CMCNa) is prepared, and a dispersion solution is prepared such that a concentration of the CNF composite in the aqueous solution is 0.1% by mass. Using an ultrasonic homogenizer (for example, Smurt NR 50-M available from Microtec Co., Ltd.;•frequency: 20 kHz; output: 50 W), the dispersion solution was subjected to ultrasonic irradiation for 40 seconds under conditions of an auto power mode and output of 50% (25 W) to prepare a sample solution suspended and homogenized.

Particle Size Distribution Measurement

The sample solution is then subjected to particle size distribution measurement according to the laser diffraction/scattering method (ISO 13320: 2009).

The samples (the CNF composites or comparative samples) used in this measurement are not subjected to any dispersion treatment other than the above standardized pretreatment for measurement. Here, the "dispersion treatment other than the above standardized pretreatment for measurement" means any conventional dispersion treatment that will affect the dispersibility, including a manual dispersion treatment with a mortar or the like, a mechanical dispersion treatment such as a jet mill, a bead mill, a ball mill, an emulsification disperser and the like, or a dispersion treatment with ultrasonic waves, such as an ultrasonic homogenizer or an ultrasonic cleaning machine.

In the above measurement, the CNF composite according to the present invention may have, in one embodiment, 70% by volume or more, for example from 70 to 95% by volume, and preferably 80% by volume or more, for example from 80 to 95% by volume, of particles each having a particle diameter of 1 μm or less. In the above measurement, the CNF composite according to the present invention may exhibit high dispersibility such that, in one embodiment, a median diameter D50 by volume is 1.0 μm or less, for example, from 0.2 to 1.0 μm, and preferably 0.5 μm or less, for example from 0.2 to 0.5 μm.

Resin Composition

The CNF composite according to the present invention can be suitably used for a conductive resin composition, because the CNF composite has high dispersibility. Such a conductive resin composition can be used as an antistatic material for electronic component packaging materials, clean room flooring materials, combustible fuel tank materials, electricity removing rolls of copying machines and the like, or as a conductive material such as a power cable covering material, a surface switch, a connector, a print circuit and the like; a resistor for a roof material and a carpet; an motor vehicle exterior material for electrostatic painting; or an electronic component housing material for electromagnetic wave shielding.

The resin used for the conductive resin composition includes, but not limited to, thermoplastic resins or thermosetting resins. Examples of the thermoplastic resin include, for example, polyvinyl chloride resins with or without a plasticizer; polyolefin resins such as low density polyethylene, high density polyethylene, linear low density polyethylene, polyolefinic elastomer (POE), various stereoregular or atactic polypropylene, a polyethylene-propylene copolymer (EPR) and cyclic polyolefin; styrene based resins such as polystyrene, an acrylonitrile-butadiene-styrene (ABS) resin and an acrylonitrile-styrene (AS) resin; poly(meth) acrylic resins such as poly(methyl acrylate), poly(methyl methacrylate), poly(ethyl acrylate), poly(ethyl methacrylate), poly(acrylic acid) and poly(methacrylic acid); polyacrylonitrile resins; polyester resins such as polybutylene terephthalate and polyethylene terephthalate; polylactic acid resins; ionomer resins; polycarbonate resins; polyamide resins such as various nylons; polyacetal resins; polyphenylene ether resins; modified polyphenylene ether resins; polyarylate resins; polysulfone resins; polyetherimide resins; polyether sulfone resins; polyphenylene sulfide resin; polyether ether ketone resins; polyether ketone resins; polyamide imide resins; thermoplastic polyimide resins; liquid crystal polyester resins; styrene-diene block copolymers such as SBS, SIS SEBS and SEPS; petroleum resins; and polymer alloys thereof. Examples of the thermosetting resin include various epoxy resins, cyanate resins, benzoxazine resins, and bismaleimide resins.

The CNF composite according to the present invention having improved dispersibility provides advantages that the composite can moderate conditions for kneading the thermoplastic resin, such as low shear rate and a short period of time, and can significantly reduce the costs for producing the resin composition. Further, the CNF composite according to the present invention having excellent conductivity can reduce the amount of conductive filler (CNF composite) required for imparting the same conductivity to the resin composition, resulting in a reduction in cost, as well as it can prevent deterioration of mechanical properties and deterioration of formability. Further, the composite having excellent dispersibility provides an advantage that lumps, aggregates and the like of CNFs are reduced, thereby easily providing high mechanical properties. Even if the resin is the thermosetting resin, there is the same advantages as described above when producing the uncured resin composition before curing.

The method for producing the conductive resin composition according to the present invention includes, but not particularly limited to, any known suitable blending methods. For example, the melt blending may be carried out in a single screw or twin screw extruder, a Banbury type mixer, a plastomill, a co-kneader, a heating roll or the like. Prior to the melt blending, each raw material may be uniformly mixed by a Henschel mixer, a ribbon blender, a super mixer, a tumbler or the like. The temperature for the melt blending is not particularly limited, but may be generally from 100 to 300° C., and preferably from 150 to 250° C. When producing a molded article of the conductive resin according to the present invention, the method for producing the molded article that can be used includes, but not particularly limited to, in general, a press molding method, an extrusion molding method, a roll molding method, an injection molding method or a transfer molding method.

Dispersion, Ink, Paint

In general, a dispersion, an ink and a paint (hereinafter referred to as a dispersion and the like) in which a conductive material is dispersed are used for producing a substrate material for electrodeposition coating, a conductive adhesive for IC, a tray for low voltage parts and a cover sheet. It is also used as a raw material of a conductive agent for electrodes of various batteries including lithium ion secondary batteries. The CNF composite according to the present invention can also be suitably used for producing the dispersion and the like, because the composite has high dispersibility. The dispersion and the like are obtained by adding the conductive material (CNF composite), a known dispersing agent and optionally a binder to a suitable solvent, mechanically dispersing them using a jet mill, a bead mill, a ball mill, an emulsifying disperser or the like, or dispersing them by means of ultrasonic waves such as an ultrasonic homogenizer or an ultrasonic washing machine. In this case, the use of the CNF composite according to the present invention provides advantages that a relatively moderate dispersion is sufficient because of the high dispersibility so that the cost of the dispersion treatment can be reduced, and the dispersion and the like having higher concentration can be easily obtained. Further, the resulting dispersion and the like contain less amount of lumps, aggregates and the like of CNFs, which are suitable for this application.

EXAMPLES

Hereinafter, the present invention will be described with reference to Examples, but these Examples are not intended to limit the present invention.

Cobalt-Magnesium Oxide Supported Catalyst: Catalyst A

Catalyst Preparation Example 1

6.17 g of cobalt nitrate hexahydrate (3N5, available from KANTO CHEMICAL CO., INC.) was weighed and dissolved in 30 g of a mixed solvent of distilled water and ethanol having a mass ratio of 2:1. To the aqueous cobalt nitrate solution was added 2.5 g of magnesium oxide (DENMAG® KMAOH-F, available from Tateho Chemical Industries Co., Ltd.) having a specific surface area of 0.61 $m^2/g$, and the mixture was stirred at 50° C. for 1 hour while maintaining the mixture in a hot water bath. After stirring, water was evaporated by means of an evaporator. The resulting solid component was dried under vacuum at 60° C. for 24 hours and then calcined at 400° C. for 5 hours. After the calcination treatment, the resulting solid component was pulverized in an agate mortar to obtain a cobalt-magnesium oxide supported catalyst on which 50% by mass of cobalt metal was supported.

Cobalt-Titanium Oxide Supported Catalyst: Catalyst B

Catalyst Preparation Example 2

2.5 g of titanium oxide (AEROXIDE® "$TiO_2$ P25", available from NIPPON AEROSIL CO., LTD., specific surface area: 52 $m^2/g$) having a molar ratio of an anatase structure to a rutile structure of 80 to 20, and 2.4 g of cobalt nitrate hexahydrate (3N5, available from KANTO CHEMICAL CO., INC.), were dissolved in 30 mL of distilled water. The resulting solution was set in a rotary evaporator (N1000, available from TOKYO RIKAKIKAI CO., LTD.), heated to 50° C. in a water bath and stirred for 1 hour. After removing water, it was further dried under vacuum at 60° C. for 12 hours to obtain a solid component. The resulting solid component was transferred to a ceramic crucible and calcined in a muffle furnace (FO 200 from YAMATO SCIENTIFIC CO., LTD.) in air at 400° C. for 5 hours to obtain a cobalt-titanium oxide supported catalyst having a cobalt supported rate of 20%.

Iron/Nickel-Graphite Supported Catalyst: Catalyst C

Catalyst Preparation Example 3

Iron (II) acetate and nickel (II) acetate tetrahydrate were weighed such that the total supported rate of iron (as a metal component) and nickel (as a metal component) per 1 g of J-SP (high purity graphite powder available from Nippon Graphite) was 5% by mass and a mass ratio of iron to nickel was 5:5, and 6 g of distilled water and 6 g of ethyl alcohol (a mass ratio of distilled water:ethyl alcohol=1:1) per 1 g of the graphite powder were added, and these substances were sufficiently dissolved and dispersed. An eggplant-shaped flask containing the resulting solution was attached to a rotary evaporator and stirred while rotating it in a water bath at 50° C. for 1 hour. The pressure of the rotary evaporator was then reduced and the solvent was removed. After removing the solvent, the flask was removed from the evaporator and dried in a vacuum dryer at 60° C. for 15 hours or more. The resulting catalyst was scraped out from the flask using a spatula and transferred to an agate mortar, and the agglomerated catalyst was pulverized to obtain an iron-nickel/graphite supported catalyst having a supported rate of 5% by mass and a mass ratio of iron to nickel of 5:5. The catalyst was stored in a dry state.

An exact amount of active species in each catalyst was determined by carrying out chemical analysis of the catalyst.
Measurement of Specific Surface Area The specific surface area of each CNF composite was determined by the BET one point method according to JIS K 6217-2: 2001 using Macsorb HM model-1201 from MOUNTECH Co., Ltd.
Measurement of Volume Resistivity (Powder Resistivity)

The volume resistivity of each CNF composite was measured according to the four point probe method under a condition of a load of 9.8 MPa in an atmosphere at 23° C. and a relative humidity of 50% using Loresta GP from Mitsubishi Chemical Analytech, Co., Ltd.: a powder resistivity measurement system, model MCP-PD 51. The measurement was carried out using 100 mg of each sample.
Evaluation of Dispersibility: Measurement of Particle Size Distribution by Laser Diffraction/Scattering Method The ratio of dispersed particles of 1 μm or less and the median diameter D50 were measured by means of a particle size distribution measuring apparatus (LS 13320 Universal Liquid Module from BECKMAN COULTER INC.).

Prior to the measurement of the ratio of dispersed particles of 1 μm or less and the median diameter, the particle size distribution measuring apparatus was tested. When a value of the median diameter D50 obtained by measurement of each test sample as described below satisfied all of the following conditions, the measurement accuracy of the apparatus was considered to be acceptance, and the particle size distribution measurement was carried out in Examples and Comparative Examples.
Preparation of Aqueous Dispersion Medium 0.10 g of sodium carboxymethyl cellulose (hereinafter referred to as "CMCNa") was added to 100 mL of distilled water and stirred at normal temperature for 24 hours or more to dissolve it to prepare an aqueous dispersion medium containing 0.1% by mass of CMCNa.
[Preparation of Aqueous CMCNa Solution]

2.0 g of CMCNa was added to 100 mL of distilled water, and stirred and dissolved at normal temperature for 24 hours or more to prepare an aqueous solution containing 2.0% by mass of CMCNa.

Preparation of Test Sample and Testing (1) Testing with Polystyrene Dispersion

An aqueous dispersion LATRON 300 LS (median diameter D50: 0.297 µm) for confirming measurement accuracy, attached to a particle size distribution measuring apparatus (LS 13 320 Universal Liquid Module from BECKMAN COULTER INC.), was used.

After setting optical models to refractive indices of 1.600 for polystyrene and 1.333 for water, respectively, and washing the module, about 1.0 mL of the above aqueous CMCNa solution was filled. After performing offset measurement, optical axis adjustment and background measurement at a pump speed of 50%, the particle size distribution measurement was carried out by adding the LATRON 300 LS to a particle diameter analyzer such that a relative concentration indicating a percentage of light scattered by particles outside the beam was from 8 to 12% or PIDS was from 40% to 55%. A graph of % by volume versus a particle size (particle diameter) was obtained and accuracy was confirmed. It was confirmed that the median diameter D50 value obtained by the measurement was within 0.297 µm±0.018 µm, the median diameter D10 value was within 0.245 µm±0.024 µm, and the median diameter D90 value was within 0.360 µm±0.036 µm.

(2) Testing with Alumina Dispersion 0.120 g of each of alumina LS-13 (median diameter D50: 45 µm) available from Denka Company Limited and alumina AS-50 (median diameter D50: 6.7 µm) available from Showa Denko K.K. was weighed in a vial, 12.0 g of the aqueous dispersion medium as described above was added, and the vial was thoroughly shaken to prepare an aqueous alumina dispersion.

After setting the optical models to refractive indices of 1.768 for alumina and 1.333 for water, respectively, and washing the module, about 1.0 mL of the above aqueous CMCNa solution was filled. After performing offset measurement, optical axis adjustment and background measurement at a pump speed of 50%, the particle size distribution measurement was carried out by adding the prepared aqueous alumina dispersion to the particle diameter analyzer such that a relative concentration indicating a percentage of light scattered by particles outside the beam was from 8 to 12% or PIDS was from 40% to 55%. A graph of % by volume versus a particle size (particle diameter) was obtained and accuracy was confirmed. It was confirmed that the median diameter D50 value obtained by the measurement was within 48.8 µm±5.0 µm for LS-13, and within 12.6 µm±0.75 µm for AS-50.

Standardized Pretreatment for Measurement 6.0 mg of each CNF composite was weighed in a vial, and 6.0 g of the aqueous dispersion medium was added thereto. An ultrasonic homogenizer Smurt NR-50 (from MICROTEC CO., LTD., output: 50 W) was used for the pretreatment for measurement.

It was confirmed that there was no deterioration of a chip which was attached to the tip of the ultrasonic homogenizer and which generated oscillation, and the chip was adjusted such that the chip was dipped in a depth of 10 mm or more from the liquid level of a sample to be treated. The chip in which a total of ultrasonic generation time was within 30 minutes were used. In the homogenizer, TIME SET (irradiation time) was set to 40 seconds, POW SET was set to 50%, START POW was set to 50% (output of 50%), and homogenization by ultrasonic irradiation was performed by auto power operation with constant output power to prepare an aqueous CNF dispersion.

Measurement of Particle Size Distribution for CNF Composite

Using the aqueous CNF composite dispersion prepared by the above method, the ratio of the dispersed particles of 1 µm or less in the CNFs and the median diameter were measured according to the following method. After setting optical models of LS 13320 Universal Liquid Module (in accordance with ISO 13320: 2009) to refractive indices of 1.520 for CNF and 1.333 for water, respectively, and washing the module, about 1.0 mL of the aqueous CMCNa solution was filled. After performing offset measurement, optical axis adjustment and background measurement at a pump speed of 50%, the prepared aqueous CNF composite dispersion was added to a particle diameter analyzer such that a relative concentration indicating a percentage of light scattered by particles outside the beam was from 8 to 12% or PIDS was from 40% to 55%, ultrasonic irradiation was performed at 78 W for 2 minutes by a device attached to the particle diameter analyzer (pretreatment for measurement), air bubbles were eliminated by circulation for 30 seconds, and particle size distribution measurement was then carried out. A graph of % by volume versus a particle size (particle diameter) was obtained, and the existence ratio of the dispersed particles of 1 µm or less and the median diameter D50 value were determined.

For the measurement, three measuring samples were sampled at different positions for one sample of the CNF composites, and the above particle size distribution measurement was carried out three times for one sample. An average value of seven values obtained by excluding the maximum value and the minimum value from nine values of each of the volume fractions and the median diameter D50 values of particles each having a particle diameter of 1 µm or less was obtained, and the average value was considered to be the measured value.

Particulate Carbon Material (Fluidizing Dispersant)

The following materials were used as carbon black. As acetylene black, DENKA BLACK "HS-100 (trade name)" (a specific surface area of 39 $m^2/g$), "FX-35 (trade name)" (a specific surface area of 133 $m^2/g$), and "Powdered Product (trade name)" (a specific surface area of 68 $m^2/g$) were used, all of which were available from Denka Company Limited. As Ketjen black, EC 300J (a specific surface area of 800 $m^2/g$) available from Lion Corporation was used. As furnace black, SUPER P Li (a primary particle size of 40 nm, a specific surface area of 62 $m^2/g$) available from Timcal Corporation was used.

The volume fraction and the median diameter D50 value of the particles each having a particle diameter of 1 µm or less were obtained by performing the above "Dispersibility Evaluation: Particle Size Distribution Measurement by Laser Diffraction/Scattering Method" in the same method on these fluidizing dispersants. The results are shown in Table 1. However, the optical model during the measurement of the particle size distribution of the fluidizing dispersant was set to a refractive index of 1.520 for acetylene black. Each of the carbon blacks used was a product satisfying the aspect ratio condition as the particulate carbon material described above.

Reactor for Synthesizing CNF

A horizontal rotary reactor 100 schematically shown in FIG. 1 was connected to a commercially available rotary evaporator rotating device (N-1110 V from TOKYO RIKAKIKAI CO., LTD.) (not shown), and batchwise reaction was carried out. The reactor 100 is composed of a fixing portion 104 (non-rotating; made of Pyrex® glass) and a rotating portion 103 (made of cylindrical quartz glass).

Further, at the center of the reactor 100 is a non-rotating gas introduction portion 105 (tubular with a diameter of 12 mm) connected to the fixing portion 104. The rotating portion 103 has a reaction portion 107 (a length of about 20 cm, a diameter of 5 cm) with a stirring blade 106 on the inner wall of the cylindrical portion at the tip of the rotating portion 103. The arrangement of the stirring blade 106 is as shown in the end view taken along the line A-A' in FIG. 2. The fixing portion 104 is provided with a gas introduction pipe 108 vertically connected to the gas introduction portion 105 and a thermocouple introduction pipe 109 straightly connected to the gas introduction portion 105. Sealed thermocouples 110 are inserted from the thermocouple introduction pipe 109 and are inverted to a degree of 180 on the outer side of the outlet of the gas introduction portion 105. Temperature measuring portions of the thermocouples measure a temperature of a gas phase in the reaction portion 107 on the outer side of the gas introduction portion 105. Three thermocouples 110 are present and measure temperatures of the center, the right end portion and the left end portion of the reaction portion 107. The entire reaction portion 107 can be uniformly heated by independently controlling three electric furnaces of three-zone horizontal type tubular electric furnaces (not shown) arranged on the outer periphery of the reaction portion 107. A gas exhaust pipe 111 connected to the outer peripheral portion of the fixing portion 104 is installed, and an exhaust gas from the reaction portion 107 is discharged from the gas exhaust pipe 111.

The reaction was carried out by charging predetermined amounts of a catalyst and a fluidizing dispersant in the reaction portion 107 of the reactor 100 and rotating the rotating portion 105 while allowing a raw material gas to flow from the gas introduction portion 108, through the gas introduction portion 105 and the reaction portion 107, and into the gas exhaust pipe 111 in a state where the reactor 100 was inclined horizontally or slightly downward.

Table 2 shows the catalyst, the amount of the active species (as metal content), the fluidizing dispersant and its amount used in each of Examples and Comparative Examples, the reaction temperature, the composition of the raw material gas, the partial pressure of the carbon monoxide gas, the flow rate of the carbon monoxide gas, the reaction time, the mass of the produced CNFs, the synthesis activity, the bulk density, the volume resistivity and the specific surface area of the resulting CNF composite, the CNF content in the CNF composite, the proportion (% by volume) of particles each having a particle diameter of 1 μm or less, and the median diameter D50.

Here, the mass of the produced CNFs is a value obtained by subtracting the total mass of the catalyst and the fluidizing dispersant from the masses of all of the recovered products. The CNF content in the CNF composite was determined by the following equation:

CNF Content in CNF Composite=Mass of Produced CNF/(Mass of Produced CNF+Mass of Particulate Carbon Material)×100(%).

Example 1

To the reactor was added the catalyst A (cobalt-magnesium oxide supported catalyst) obtained in Catalyst Preparation Example 1 in an amount of 24 mg based on the mass of the active species cobalt metal, and acetylene black (Denka Black, HS-100) in an amount of 1.5 g. A nitrogen gas flowed at room temperature under atmospheric pressure while rotating the rotating portion at 30 rpm and sufficiently replaced in the reactor, and the temperature rising was then started. When the temperature reached 605° C. (a temperature of minus 50° C. relative to the reaction temperature), reducing gases (90 m/min of nitrogen and 200 m/min of hydrogen at actual flow rates) instead of the nitrogen gas flowed under atmospheric pressure. After reaching the reaction temperature of 655° C., the flowing of the reducing gases was stopped after 20 minutes from the start of flowing of the reducing gases, and reaction gases (carbon monoxide: 13 NL/g-active species•minute, hydrogen: 2.3 NL/g-activity species•minute) flowed under atmospheric pressure. The reaction was carried out for 3 hours while maintaining the temperature at 655° C. The raw material gases were stopped and the reactor was cooled while replacing the raw material gases with the nitrogen gas.

Examples 2 to 16

The reaction was carried out under the same conditions as those of Example 1 with the exception that the conditions shown in Table 2 were changed.

Comparative Example 1

The reaction was carried out under the same conditions as those of Examples 1, 2 and 3, with the exception that a small amount of CNF was used in place of the fluidizing dispersant of the present invention. This CNF is obtained by Reference Example and has high dispersibility.

Comparative Example 2

The reaction was carried out under the same conditions as those of Example 4, with the exception that a small amount of CNF was used in place of the fluidizing dispersant of the present invention. This CNF is obtained by Reference Example and has high dispersibility.

Comparative Example 3

The reaction was carried out in the same method as that of Example 4 and Comparative Example 2, with the exception that the fluidizing dispersant or the CNFs of the present invention were not used, and the reaction was carried out using only the catalyst. Many of the resulting CNFs were recovered in a state where they adhered to the wall surface of the reactor. It is considered that most of the catalyst and produced CNFs did not flow during the reaction.

Comparative Example 4

The reaction was carried out under the same conditions as those of Example 1 with the exception that the conditions shown in Table 2 were changed. The specific change is that 10 g of zirconia beads (a diameter of 2 mm) was used as a fluidizing dispersant in place of the fluidizing dispersant of the present invention. The resulting product was passed through a sieve to obtain CNFs alone.

Comparative Example 5

The reaction was carried out under the same conditions as those of Example 4, with the exception that the reactor was not rotated.

TEM observation demonstrated that CNFs in the CNF composite obtained in each Example and Comparative Example were MWCNTs. Further, it was also confirmed that the average outer diameter and the aspect ratio indicating the ratio of the fiber length to the average outer diameter satisfied the definition of CNF according to the present invention. By way of example, FIGS. 3, 4 and 5 show TEM photographs of CNFs in the composites obtained in Example 1, Example 8, and Example 9, respectively.

When comparing Examples 1, 2, and 3 with Comparative Example 1, it is understood that each CNF composite obtained by carrying out the reaction using the fluidizing dispersant according to the present invention as a fluidizing dispersant has higher dispersibility for the CNF content of each CNF composite, in view of its volume fraction of dispersed particles of 1 µm or less and its value of median diameter D50. On the contrary, in Comparative Example 1, CNFs having lower dispersibility were obtained. When comparing Example 4 with Comparative Example 2, the CNF composite obtained by carrying out the reaction using the fluidizing dispersant according to the present invention as a fluidizing dispersant exhibits higher dispersibility as well. On the contrary, in Comparative Example 2, CNFs having lower dispersibility are obtained. As shown in Examples 5 and 6, even if the fluidizing dispersant used is changed to other acetylene black that meets the conditions of the present invention, a highly dispersible CNF composite can be obtained as well. As shown in Examples 7 to 14, it was confirmed that each of the CNF composites obtained by changing the catalyst, the temperature, the flow rates of the gases, and the amount of the fluidizing dispersant used (that is, the CNF content in the CNF composite) within the scope of the present invention exhibited higher dispersibility. In Examples 15 and 16, it was confirmed that even if the fluidizing dispersant used was changed to Ketjen black or furnace black which are other carbon blacks meeting the conditions of the present invention, the CNF composites having higher dispersibility could be obtained as well. As shown in Comparative Example 3, when no fluidizing dispersant was used, the fluidity of the catalyst or CNFs in the reactor was deteriorated. Also, the dispersibility of the resulting CNFs was poor. In Comparative Example 4, CNFs were produced under substantially the same conditions as those of Examples 4 and 5 with the exception that zirconia beads were used, but the CNFs obtained under the conditions had poor dispersibility. FIG. 6 shows the results of the dispersibility evaluation (a graph showing the frequency distribution of % by volume versus a particle diameter) of the CNF composite obtained in Example 1. FIG. 7 shows the results of the dispersibility evaluation (a graph showing the frequency distribution of % by volume versus a particle diameter) of the CNF composite obtained in Comparative Example 1. Comparative Example 5 shows the results obtained by carrying out the reaction without rotating the reactor, but under the conditions, the CNF composite having poor dispersibility was obtained.

REFERENCE EXAMPLE

Under the conditions shown in Table 2, 10 g of zirconia beads (a diameter of 2 mm) was used as a fluidizing dispersant in place of the fluidizing dispersant according to the present invention. In this case, the product obtained is MWCNTs. When using the catalyst, CNFs having good dispersibility can be synthesized at a temperature of 700° C. The CNFs were used as a fluidizing dispersant for Comparative Examples 1 and 2.

Comparison of CNF syntheses at the same temperature, that is, comparison of Example 10 with Reference Example or Example 4 with Comparative Example 4 shows that the activity of CNF synthesis per unit active species is significantly higher in Example 10 and Example 4. The reason would be that the fluidizing dispersant according to the present invention enables more efficient contact of the raw material gas with the catalyst due to the dispersibility and fineness of the fluidizing dispersant, as compared with the ceramic ball fluidizing dispersant.

In view of the foregoing, it is understood that the growth of CNFs through the mechanical stirring in the coexistence of the fluidizing dispersant such as carbon black, the catalyst and the raw material gas containing the carbon-containing compound can prevent the CNFs from being entangled and allow the highly dispersed CNF composite material to be efficiently obtained. FIG. 8 shows a SEM photograph of the CNF composite obtained in Example 2. As can be seen from the FIG. 8, particulate acetylene black and fibrous CNFs uniformly commingles with each other.

Removal of Residual Catalyst

Example 17

Using the CNF composite obtained in Example 4, the catalyst was removed by a heat treatment. 1.0 g of CNFs was placed in a graphite crucible, the crucible was set in a graphitizing furnace from Thermonic Co., Ltd, without a lid, and the temperature was increased at 25° C./min in a nitrogen atmosphere and maintained at 1700° C. for 3 hours. An amount of the residual catalyst for the sample after the heat treatment was quantified. The results are shown in Table 3.

Example 18

The heat treatment was carried out in the same method as that of Example 17, with the exception that the heat treatment conditions were changed to 2000° C. and 1 hour.

Examples 19 and 20

Using the CNF composite obtained in Example 7, each heat treatment was carried out in the same method as in each of Examples 17 and 18.

Comparative Examples 4 and 6

Each heat treatment was carried out in the same method as in each of Examples 17 and 19 with the exception that the heat treatment conditions were changed to 1200° C. and 3 hours.

Comparative Examples 5 and 7

Using 0.2 g of each of the CNF complexes obtained in Examples 4 and 7, the residual catalyst was removed by the following acid dissolution treatment without any heat treatment. That is, each CNF composite was added to 300 mL of an aqueous 1N hydrochloric acid solution, stirred for 24 hours, then collected by filtration and washed with a sufficient amount of distilled water.

As can be seen from the results shown in Table 3, it is difficult to sufficiently remove the catalyst under the heat treatment conditions shown in Comparative Examples. Further, in the removal of residual catalyst by the acid treatment, the removal rate of the residual catalyst is higher, but the removal of the active species metal is not sufficient. In contrast, as shown in Examples, the conducting of the heat treatment at a temperature of 1500° C. or more and 2500° C. or less in an inert gas allows efficient residual catalyst removal which matches to the object of the present invention.

TABLE 1

| Fluidizing Dispersant | Name of Product | Particles of 1 μm or less [% by volume] | Median Diameter D50 [μm] |
|---|---|---|---|
| Acetylene Black | DENKA BLACK HS-100 | 95 | 0.4 |
| Acetylene Black | DENKA BLACK FX-35 | 87 | 0.4 |
| Acetylene Black | DENKA BLACK Powdered Product | 95 | 0.4 |
| Ketjen Black | EC 300J | 85 | 0.4 |
| Furnace Black | SUPER P | 95 | 0.4 |

TABLE 2

| Test No. | Type of Catalyst — Catalyst Used | Amount of Active Species/mg | Fluidizing Dispersant — Type | Fluidizing Dispersant — Used Amount/g | Reaction Temperature [°C] | Raw Material Gas Composition (Molar Ratio) | Carbon Monoxide Gas Partial Pressure [MPa] | Carbon Monoxide Gas Flow Rate [NL/g-active species · min] | Reaction Time [h] |
|---|---|---|---|---|---|---|---|---|---|
| Example 1 | Catalyst Preparation Example 1 Co/MgO | 24 | Acetylene Black HS-100 | 1.5 | 655 | $CO/H_2/N_2$ = 85/15/0 | 0.086 | 13 | 3 |
| Example 2 | Catalyst Preparation Example 1 Co/MgO | 24 | Acetylene Black HS-100 | 1 | 655 | $CO/H_2/N_2$ = 85/15/0 | 0.086 | 13 | 3 |
| Example 3 | Catalyst Preparation Example 1 Co/MgO | 24 | Acetylene Black HS-100 | 3.6 | 655 | $CO/H_2/N_2$ = 85/15/0 | 0.086 | 13 | 3 |
| Example 4 | Catalyst Preparation Example 1 Co/MgO | 77 | Acetylene Black HS-100 | 0.65 | 655 | $CO/H_2/N_2$ = 85/15/0 | 0.086 | 6 | 1 |
| Example 5 | Catalyst Preparation Example 1 Co/MgO | 77 | Acetylene Black FX-35 | 0.65 | 655 | $CO/H_2/N_2$ = 85/15/0 | 0.086 | 6 | 1 |
| Example 6 | Catalyst Preparation Example 1 Co/MgO | 77 | Acetylene Black Powdered Product | 0.65 | 655 | $CO/H_2/N_2$ = 85/15/0 | 0.086 | 6 | 1 |
| Example 7 | Catalyst Preparation Example 1 Co/MgO | 40 | Acetylene Black HS-100 | 2.0 | 610 | $CO/H_2/N_2$ = 85/15/0 | 0.086 | 25 | 1 |
| Example 8 | Catalyst Preparation Example 2 Co/TiO2 | 27 | Acetylene Black HS-100 | 1.4 | 610 | $CO/H_2/N_2$ = 51/22/27 | 0.052 | 53 | 1 |
| Example 9 | Catalyst Preparation Example 3 Fe—Ni/C | 14 | Acetylene Black HS-100 | 1.3 | 610 | $CO/H_2/N_2$ = 51/22/27 | 0.052 | 53 | 1 |
| Example 10 | Catalyst Preparation Example 1 Co/MgO | 77 | Acetylene Black HS-100 | 0.65 | 700 | $CO/H_2/N_2$ = 85/15/0 | 0.086 | 6 | 1 |
| Example 11 | Catalyst Preparation Example 1 Co/MgO | 77 | Acetylene Black HS-100 | 0.65 | 750 | $CO/H_2/N_2$ = 85/15/0 | 0.086 | 6 | 1 |
| Example 12 | Catalyst Preparation Example 1 Co/MgO | 40 | Acetylene Black HS-100 | 2 | 610 | $CO/H_2/N_2$ = 85/15/0 | 0.086 | 25 | 1 |
| Example 13 | Catalyst Preparation Example 1 Co/MgO | 40 | Acetylene Black HS-100 | 1.6 | 610 | $CO/H_2/N_2$ = 85/15/0 | 0.086 | 25 | 1 |
| Example 14 | Catalyst Preparation Example 1 Co/MgO | 20 | Acetylene Black HS-100 | 1.2 | 655 | $CO/H_2/N_2$ = 85/15/0 | 0.086 | 51 | 1 |

TABLE 2-continued

| | | | | | | | | | |
|---|---|---|---|---|---|---|---|---|---|
| Example 15 | Catalyst Preparation Example 1 Co/MgO | 77 | Ketjen Black EC 300J | 0.65 | 655 | $CO/H_2/N_2 =$ 85/15/0 | 0.086 | 6 | 1 |
| Example 16 | Catalyst Preparation Example 1 Co/MgO | 77 | Furnace black SUPER P | 0.65 | 655 | $CO/H_2/N_2 =$ 85/15/0 | 0.086 | 6 | 1 |
| Comparative Example 1 | Catalyst Preparation Example 1 Co/MgO | 24 | CNF | 0.023 | 655 | $CO/H_2/N_2 =$ 85/15/0 | 0.086 | 13 | 3 |
| Comparative Example 2 | Catalyst Preparation Example 1 Co/MgO | 77 | CNF | 0.075 | 655 | $CO/H_2/N_2 =$ 85/15/0 | 0.086 | 6 | 1 |
| Comparative Example 3 | Catalyst Preparation Example 1 Co/MgO | 77 | Non | 0 | 655 | $CO/H_2/N_2 =$ 85/15/0 | 0.086 | 6 | 1 |
| Comparative Example 4 | Catalyst Preparation Example 1 Co/MgO | 120 | Zirconia Beads | 10 | 655 | $CO/H_2/N_2 =$ 85/15/0 | 0.086 | 6 | 1 |
| Comparative Example 5* | Catalyst Preparation Example 1 Co/MgO | 77 | Acetylene Black HS-100 | 0.65 | 655 | $CO/H_2/N_2 =$ 85/15/0 | 0.086 | 6 | 1 |
| Reference Example | Catalyst Preparation Example 1 Co/MgO | 120 | Zirconia Beads | 10 | 700 | $CO/H_2/N_2 =$ 85/15/0 | 0.086 | 6 | 1 |

| Test No. | Mass of Produced CNF [g] | Synthesis Activity [g-CNF/g-active species · h] | Bulk Density [g/cm$^3$] | Volume Resistivity [Ω · cm] | Specific Surface Area [m$^2$/g] | CNF Content in CNF Composite [wt %] | Percentage of Particles Having Particle Diameter of 1 μm or less [vol %] | Median Diameter D50 [μm] |
|---|---|---|---|---|---|---|---|---|
| Example 1 | 1.41 | 20 | 0.082 | 0.024 | 134 | 48 | 83 | 0.4 |
| Example 2 | 1.68 | 23 | 0.074 | 0.016 | 140 | 63 | 83 | 0.4 |
| Example 3 | 1.33 | 19 | 0.099 | 0.028 | 88 | 27 | 80 | 0.5 |
| Example 4 | 3.05 | 40 | 0.041 | 0.014 | 136 | 82 | 81 | 0.4 |
| Example 5 | 2.65 | 35 | 0.034 | 0.016 | 172 | 80 | 86 | 0.3 |
| Example 6 | 2.83 | 37 | 0.03 | 0.016 | 138 | 81 | 81 | 0.3 |
| Example 7 | 1.74 | 44 | 0.077 | 0.031 | 153 | 47 | 81 | 0.4 |
| Example 8 | 0.46 | 17 | 0.095 | 0.033 | 120 | 25 | 87 | 0.4 |
| Example 9 | 0.47 | 34 | 0.119 | 0.029 | 126 | 27 | 88 | 0.4 |
| Example 10 | 1.96 | 25 | 0.048 | 0.016 | 115 | 75 | 89 | 0.3 |
| Example 11 | 0.85 | 11 | 0.1 | 0.030 | 82 | 57 | 89 | 0.3 |
| Example 12 | 1.74 | 44 | 0.077 | 0.031 | 142 | 47 | 81 | 0.4 |
| Example 13 | 2.30 | 58 | 0.083 | 0.030 | 171 | 59 | 81 | 0.4 |
| Example 14 | 1.16 | 59 | 0.097 | 0.022 | Unmeasured | 49 | 85 | 0.4 |
| Example 15 | 3.40 | 44 | 0.035 | 0.013 | 197 | 84 | 86 | 0.4 |
| Example 16 | 3.20 | 42 | 0.034 | 0.017 | 150 | 83 | 82 | 0.4 |
| Comparative Example 1 | 1.30 | 18 | 0.063 | 0.015 | 180 | 98 | 18 | 16.8 |
| Comparative Example 2 | 2.64 | 35 | 0.033 | 0.016 | 171 | 97 | 10 | 24.5 |
| Comparative Example 3 | 2.01 | 26 | 0.035 | 0.016 | 170 | 100 | 15 | 27.0 |
| Comparative Example 4 | 3.20 | 26 | 0.079 | 0.022 | 193 | 100 | 22 | 15.0 |
| Comparative Example 5* | 1.60 | 21 | 0.052 | 0.020 | 113 | 71 | 26 | 11.0 |
| Reference Example | 2.20 | 18 | 0.062 | 0.017 | 128 | 100 | 81 | 0.4 |

*The reaction was carried out without rotating the reactor.

TABLE 3

| | Object | Heat Treatment Condition | Cobalt | | Magnesium | |
|---|---|---|---|---|---|---|
| | | | Remaining Amount/wt % | Removal Rate/% | Remaining Amount/wt % | Removal Rate/% |
| Reference | CNF Composite Obtained in Example 4 | Untreated | 2.10 | — | 2.3 | — |
| Example 17 | CNF Composite Obtained in Example 4 | 1700° C., 3 h | 0.15 | 93 | 0.01 or less | 99 or more |
| Example 18 | CNF Composite Obtained in Example 4 | 2000° C., 1 h | 0.01 or less | 99 or more | 0.01 or less | 99 or more |
| Comparative Example 4 | CNF Composite Obtained in Example 4 | 1200° C., 3 h | 1.7 | 19 | 2.1 | 9 |
| Comparative Example 5 | CNF Composite Obtained in Example 4 | Conducted Acid Treatment without Heat Treatment | 1.2 | 43 | 0.01 or less | 99 or more |
| Reference | CNF Composite Obtained in Example 7 | Untreated | 1.1 | — | 1.2 | — |
| Example 19 | CNF Composite Obtained in Example 7 | 1700° C., 3 h | 0.1 | 91 | 0.01 or less | 99 or more |
| Example 20 | CNF Composite Obtained in Example 7 | 2000° C., 1 h | 0.01 or less | 99 or more | 0.01 or less | 99 or more |
| Comparative Example 6 | CNF Composite Obtained in Example 7 | 1200° C., 3 h | 0.8 | 27 | 1 | 17 |
| Comparative Example 7 | CNF Composite Obtained in Example 7 | Conducted Acid Treatment without Heat Treatment | 0.5 | 55 | 0.01 or less | 99 or more |

DESCRIPTION OF REFERENCE NUMERALS

100 reactor
103 rotating portion
104 fixing portion
105 gas introduction portion
106 stirring blade
107 reaction portion
108 gas introduction pipe
109 thermocouple introduction tube
110 thermocouple
111 gas exhaust pipe

What is claimed is:

1. A method for producing a carbon nanofiber composite, comprising bringing at least one catalyst and at least one particulate carbon material as a fluidizing dispersant which imparts fluidity to the catalyst into contact with at least one gas containing at least one gaseous carbon-containing compound, while mechanically stirring the catalyst and the particulate carbon material in a state that the catalyst is fluid with respect to the particulate carbon material in a reactor, and
   wherein the particulate carbon nanofiber composite comprises 70% by volume and more of particles within (i) a particle diameter of 1 μm or less, and (ii) a median diameter D50 by volume of 1 μm or less.

2. The method for producing the carbon nanofiber composite according to claim 1, wherein the reactor comprises a rotary reactor.

3. The method for producing the carbon nanofiber composite according to claim 1, wherein the carbon nanofiber composite comprises 70% by volume or more of particles with a particle diameter of 1 μm or less, and a median diameter D50 by volume of 1 μm or less.

4. The method for producing the carbon nanofiber composite according to claim 1, wherein the particulate carbon material comprises one or more selected from graphite, carbon black, and graphene.

5. The method for producing the carbon nanofiber composite according to claim 1, wherein the gaseous carbon-containing compound comprises carbon monoxide.

6. The method for producing the carbon nanofiber composite according to claim 1, wherein the method comprises carrying out the reaction at a temperature ranging from 550° C. to 900° C. in the reactor.

7. The method for producing the carbon nanofiber composite according to claim 1, wherein the catalyst comprises one or more of the following (A), (B) and (C):
   (A) a catalyst in which an active species mainly based on cobalt is supported on a support comprising an oxide containing magnesium;
   (B) a catalyst in which an active species mainly based on cobalt is supported on a support comprising an oxide containing titanium; and
   (C) a catalyst in which an active species mainly based on any of iron and nickel is supported on a carbon particle support.

8. The method for producing the carbon nanofiber composite according to claim 1, wherein the method comprises allowing the gas containing the gaseous carbon-containing compound to flow such that the gaseous carbon-containing compound flows through the reactor at a flow rate of 0.1 NL/g-active species-minute or more.

9. The method for producing the carbon nanofiber composite according to claim 1, wherein the gas containing the gaseous carbon-containing compound further comprises hydrogen.

* * * * *